(12) United States Patent
Watanabe

(10) Patent No.: US 8,594,487 B2
(45) Date of Patent: *Nov. 26, 2013

(54) RECORDING APPARATUS/METHOD/MEDIUM AND REPRODUCING APPARATUS/METHOD

(75) Inventor: Akinobu Watanabe, Kawasaki (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 22 days.

This patent is subject to a terminal disclaimer.

(21) Appl. No.: 13/085,528

(22) Filed: Apr. 13, 2011

(65) Prior Publication Data

US 2012/0002939 A1    Jan. 5, 2012

(30) Foreign Application Priority Data

Jun. 30, 2010  (JP) ................................. 2010-148496

(51) Int. Cl.
*H04N 9/80*   (2006.01)
(52) U.S. Cl.
USPC .......................................... 386/241; 386/290
(58) Field of Classification Search
USPC ................................. 386/241, 290
See application file for complete search history.

(56) References Cited

U.S. PATENT DOCUMENTS

| 8,139,930 | B2 * | 3/2012 | Ogawa et al. ................. 386/341 |
| 8,369,691 | B2 * | 2/2013 | Watanabe ..................... 386/326 |
| 2004/0252974 | A1 | 12/2004 | Sugimura et al. |
| 2009/0202227 | A1 | 8/2009 | Jang et al. |
| 2009/0220213 | A1 | 9/2009 | Ogawa et al. |
| 2009/0324202 | A1 | 12/2009 | Okubo et al. |
| 2010/0092148 | A1 | 4/2010 | Ogawa et al. |
| 2010/0150523 | A1 | 6/2010 | Okubo et al. |

FOREIGN PATENT DOCUMENTS

| CN | 101682719 | 3/2010 |
| EP | 1 693 844 | 8/2006 |
| JP | 2003168591 | 6/2003 |
| JP | 2005-006132 | 1/2005 |

OTHER PUBLICATIONS

Anonymous: "White Paper Blu-Ray Disc Rewritable Format: Audio Visual Application Format Specifications for BD-RE Version 2.1", Mar. 31, 2008.
Anonymous: "White paper Blu-ray Disc Format: 2.B Audio Visual Application Format Specifications for BD-ROM Version 2.4", Apr. 30, 2010.
CN Office Action for Chinese Patent Application No. 201110105661.7, issued on Jul. 22, 2013.

* cited by examiner

*Primary Examiner* — Thai Tran
*Assistant Examiner* — Girumsew Wendmagegn
(74) *Attorney, Agent, or Firm* — Antonelli, Terry, Stout & Kraus, LLP.

(57) ABSTRACT

The present invention relates to recording and reproducing methods, recording and reproducing apparatuses, and a recording medium. In conventional techniques, even when recorded program contents are 3D-(stereoscopic view)-corresponding contents or non-3D-corresponding contents, there has been no means to easily distinguish the difference therebetween. Furthermore, there has been a problem that a virtual play list in which 3D contents and non-3D contents are mixed is unintentionally generated. In the present invention, the above described problems are solved by recording a 3D flag in a play list file. Furthermore, upon generation of a virtual play list, the set value of the recorded 3D flag is obtained, and whether 3D contents and non-3D contents are mixed or not is checked, thereby solving the problems.

2 Claims, 27 Drawing Sheets

3652

| PLAY LIST | AFTER GENERATION | | |
|---|---|---|---|
| | 3301 | 3302 | 3406 |
| 3D FLAG | 1 | 1 | 1 |
| | 1 | 0 | 1 (WITH WARNING)/ - (GENERATION PROHIBITED) |
| | 0 | 0 | 0 |

FIG. 2

| | |
|---|---|
| TYPE | 201 |
| VERSION NUMBER | 202 |
| PLAY LIST INFORMATION STARTING ADDRESS | 203 |
| PLAY LIST MARK INFORMATION STARTING ADDRESS | 204 |
| MANUFACTURER'S UNIQUE DATA STARTING ADDRESS | 205 |
| USER INTERFACE APPLICATION INFORMATION | 206 |
| PLAY LIST INFORMATION | 207 |
| PLAY LIST MARK INFORMATION | 208 |
| MANUFACTURER'S UNIQUE DATA | 209 |

FIG. 3

| | |
|---|---|
| LENGTH | ~301 |
| 3D FLAG | ~331 |
| CHARACTER CODE | ~302 |
| REPRODUCTION PROTECTION FLAG | ~303 |
| RECORDING PROTECTION FLAG | ~304 |
| REPRODUCTION-DONE FLAG | ~305 |
| EDITING-DONE FLAG | ~306 |
| TIME ZONE | ~307 |
| RECORDED DATE AND TIME | ~308 |
| PLAY LIST LENGTH | ~309 |
| MANUFACTURER ID | ~310 |
| MODEL CODE | ~311 |
| CHANNEL NUMBER | ~312 |
| CHANNEL NAME LENGTH | ~313 |
| CHANNEL NAME | ~314 |
| PLAY LIST NAME LENGTH | ~315 |
| PLAY LIST NAME | ~316 |
| PLAY LIST DETAIL LENGTH | ~317 |
| PLAY LIST DETAIL | ~318 |

FIG. 4

| | |
|---|---|
| PADDING | ~401 |
| SUMMER TIME FLAG | ~402 |
| TIME ZONE CODE | ~403 |
| TIME ZONE VALUE | ~404 |
| 30-MINUTE FLAG | ~405 |

FIG. 5

| | |
|---|---|
| LENGTH | ~501 |
| PLAY LIST CPI TYPE | ~502 |
| THE NUMBER OF PLAY ITEMS | ~503 |
| THE NUMBER OF SUB PLAY ITEMS | ~504 |
| PLAY ITEM | ~505 |
| SUB PLAY ITEM | ~506 |

FIG. 6

| | |
|---|---|
| LENGTH | ~601 |
| CLIP INFORMATION FILE NAME | ~602 |
| CLIP CODEC INFORMATION | ~603 |
| CONNECTION CONDITION | ~604 |
| STC INFORMATION | ~605 |
| IN TIME | ~606 |
| OUT TIME | ~607 |
| BRIDGE SEQUENCE INFORMATION | ~608 |

FIG. 7

| | |
|---|---|
| BRIDGE SEQUENCE INFORMATION FILE NAME | ~701 |
| CLIP CODEC INFORMATION | ~702 |

FIG. 8

| | |
|---|---|
| LENGTH | ~801 |
| CLIP INFORMATION FILE NAME | ~802 |
| CLIP CODEC INFORMATION | ~803 |
| SUB PLAY ITEM TYPE | ~804 |
| STC ID | ~805 |
| SUB PLAY ITEM IN TIME | ~806 |
| SUB PLAY ITEM OUT TIME | ~807 |
| SYNCHRONIZATION PLAY ITEM ID | ~808 |
| SYNCHRONIZATION PLAY ITEM START PTS | ~809 |

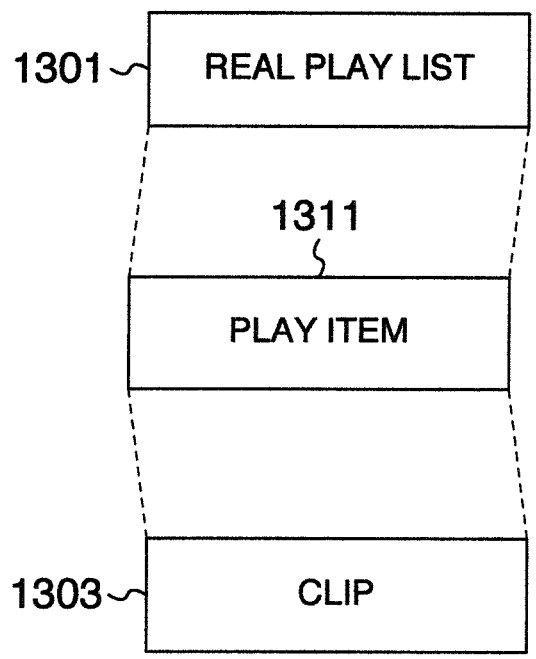

| | BEFORE DIVIDING | AFTER DIVIDING | 1751 |
|---|---|---|---|
| PLAY LIST | 1501 | 1611 | 1612 |
| 3D FLAG | 1 | 1 | 1 |
| | 0 | 0 | 0 |

| | BEFORE COUPLING | | AFTER COUPLING |
|---|---|---|---|
| PLAY LIST | 1811 | 1812 | 1921 |
| 3D FLAG | 1 | 1 | 1 |
| | 1 | 0 | 1 (WITH WARNING)/<br>- (COUPLING PROHIBITED) |
| | 0 | 0 | 0 |

2051

2101 — REAL PLAY LIST

2103 — CLIP

| | BEFORE DELETION | AFTER DELETION |
|---|---|---|
| PLAY LIST | 2101 | — |
| 3D FLAG | 1 | — |
| | 0 | — |

2251

|  | BEFORE PARTIAL DELETION | AFTER PARTIAL DELETION 2551 |
|---|---|---|
| PLAY LIST | 2301 | 2421 |
| 3D FLAG | 1 | 1 |
|  | 0 | 0 |

| | BEFORE PARTIAL DELETION | AFTER PARTIAL DELETION 2851 |
|---|---|---|
| PLAY LIST | 2601 | 2711 |
| 3D FLAG | 1 | 1 |
| | 0 | 0 |

FIG. 31

| | BEFORE GENERATION 3151 | |
|---|---|---|
| PLAY LIST | 2901 | 2902 |
| 3D FLAG | 1 | 1 |
| | 1 | 0 |
| | 0 | 0 |

FIG. 32

| | AFTER GENERATION 3252 | | |
|---|---|---|---|
| PLAY LIST | 3001 | 3002 | 3106 |
| 3D FLAG | 1 | 1 | 1 |
| | 1 | 0 | 1 (WITH WARNING)/ - (GENERATION PROHIBITED) |
| | 0 | 0 | 0 |

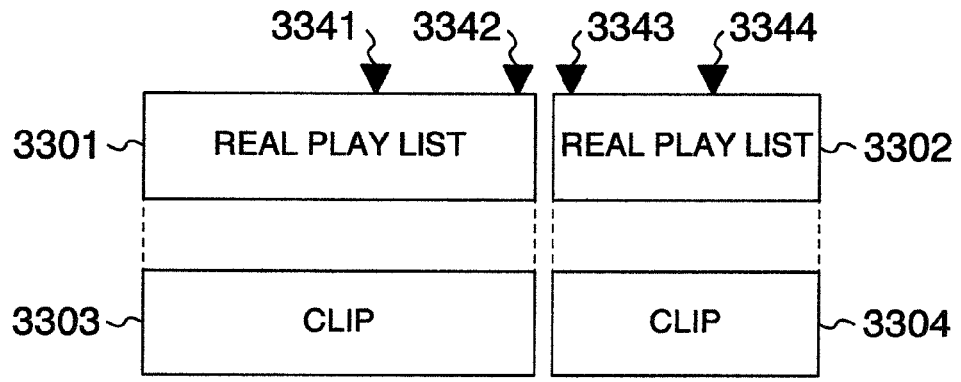
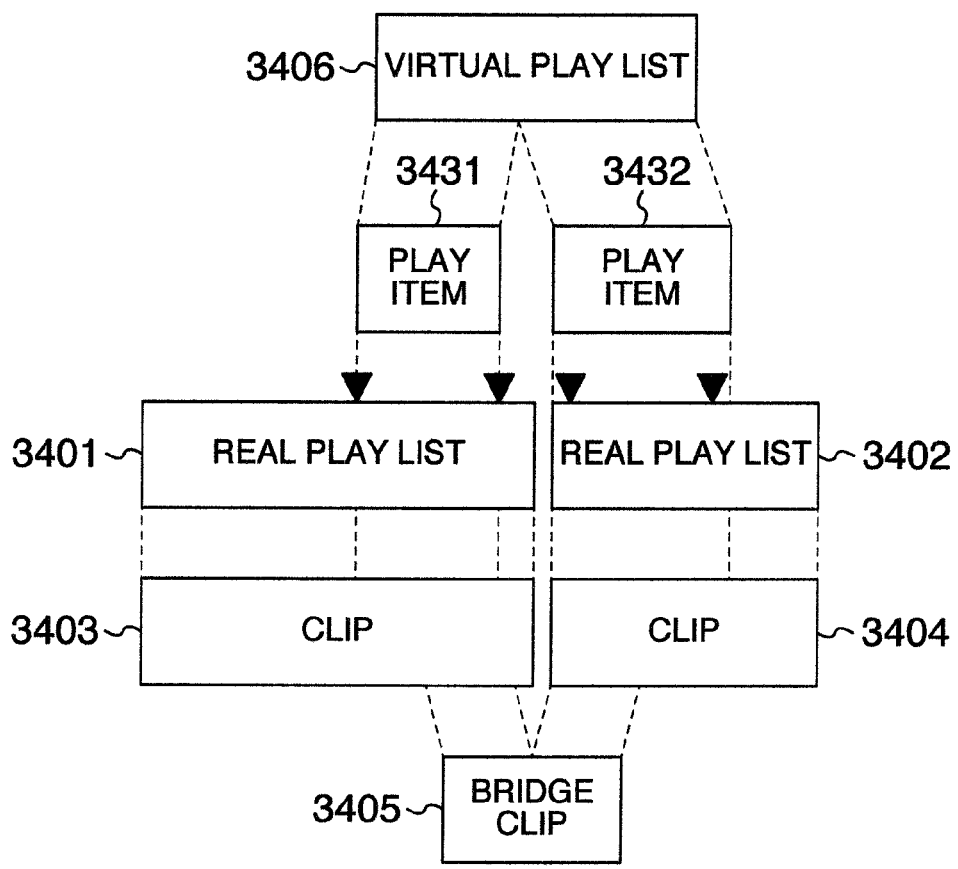

FIG. 35

| | BEFORE GENERATION | | 3551 |
|---|---|---|---|
| PLAY LIST | 3301 | 3302 | |
| 3D FLAG | 1 | 1 | |
| | 1 | 0 | |
| | 0 | 0 | |

FIG. 36

| | AFTER GENERATION | | | 3652 |
|---|---|---|---|---|
| PLAY LIST | 3301 | 3302 | 3406 | |
| 3D FLAG | 1 | 1 | 1 | |
| | 1 | 0 | 1 (WITH WARNING)/ - (GENERATION PROHIBITED) | |
| | 0 | 0 | 0 | |

RECORDING APPARATUS/METHOD/MEDIUM AND REPRODUCING APPARATUS/METHOD

INCORPORATION BY REFERENCE

The present application claims priority from Japanese application JP2010-148496 filed on Jun. 30, 2010, the content of which is hereby incorporated by reference into this application.

BACKGROUND OF THE INVENTION

1. Field of the Invention

The present invention relates to a recording apparatus/method/medium and a reproducing apparatus/method.

2. Description of Related Art

The broadcasting of the contents corresponding to 3D (stereoscopic view) by digital broadcasting has been started by several methods such as side-by-side and top-and-bottom. However, the techniques used in these methods realize 3D not without reducing the image quality (resolution and frame rate) compared with non-3D digital broadcasting contents. For example, in the side-by-side method, 3D is realized by reducing the horizontal resolution by half.

On the other hand, recorders for recording digital broadcasting on large-capacity optical disks using blue laser and players for reproducing the optical disks on which digital broadcasting has been recorded are widely used. A main purpose of these recorders and players is to record and reproduce non-3D contents. The players supporting 3D are expected to be popularized in the future.

In JP-A-2003-168591, a method of reproducing the contents (particularly, still images and audios) recorded on an optical disk and a data management method of, for example, a play list on an optical disk are proposed.

In conventional techniques, even when recorded program contents are the contents supporting 3D (stereoscopic view) or not supporting 3D, there has been no means that easily distinguishes the difference between them. Furthermore, there has been a problem that a virtual play list in which 3D contents and non-3D contents are mixed is unintentionally generated.

SUMMARY OF THE INVENTION

In the present invention, the above described problem is solved by recording a 3D flag in a play list file. Furthermore, upon generation of a virtual play list, the set value of the recorded 3D flag is obtained, and whether 3D contents and non-3D contents are mixed or not is confirmed, thereby solving the problem.

The present invention has the effect that whether the contents are 3D or not can be easily and quickly determined by the above described means only by referencing the 3D flag from the play list file in the display of a recorded program list in the case in which 3D broadcasting program contents are recorded. Furthermore, there is the effect of preventing generation of a virtual play list in which 3D contents and non-3D contents are mixed.

Other objects, features and advantages of the invention will become apparent from the following description of the embodiments of the invention taken in conjunction with the accompanying drawings.

BRIEF DESCRIPTION OF THE DRAWING

FIG. 2 is a schematic diagram showing the structure of a play list file;

FIG. 3 is a schematic diagram showing the structure of user interface application information;

FIG. 4 is a schematic diagram showing the structure of a time zone;

FIG. 5 is a schematic diagram showing the structure of play list information;

FIG. 6 is a schematic diagram showing the structure of a play item;

FIG. 7 is a schematic diagram showing the structure of bridge sequence information;

FIG. 8 is a schematic diagram showing the structure of a sub play item;

FIG. 13 is a schematic diagram showing an example of generation of a real play list;

FIG. 14 is a table showing a 3D flag of a generated real play list;

FIG. 31 is a table showing 3D flags before editing in the example of the assemble editing (non-seamless connection of the two play items);

FIG. 32 is a table showing 3D flags after the editing in the example of the assemble editing (non-seamless connection of the two play items);

FIG. 33 is a schematic diagram showing an example of assemble editing (seamless connection of two play items);

FIG. 34 is a schematic diagram showing the example of the assemble editing (seamless connection of the two play items);

FIG. 35 is a table showing 3D flags before the editing in the example of the assemble editing (seamless connection of the two play items);

FIG. 36 is a table showing 3D flags after the editing in the example of the assemble editing (seamless connection of the two play items);

DETAILED DESCRIPTION OF THE INVENTION

Figure 1:
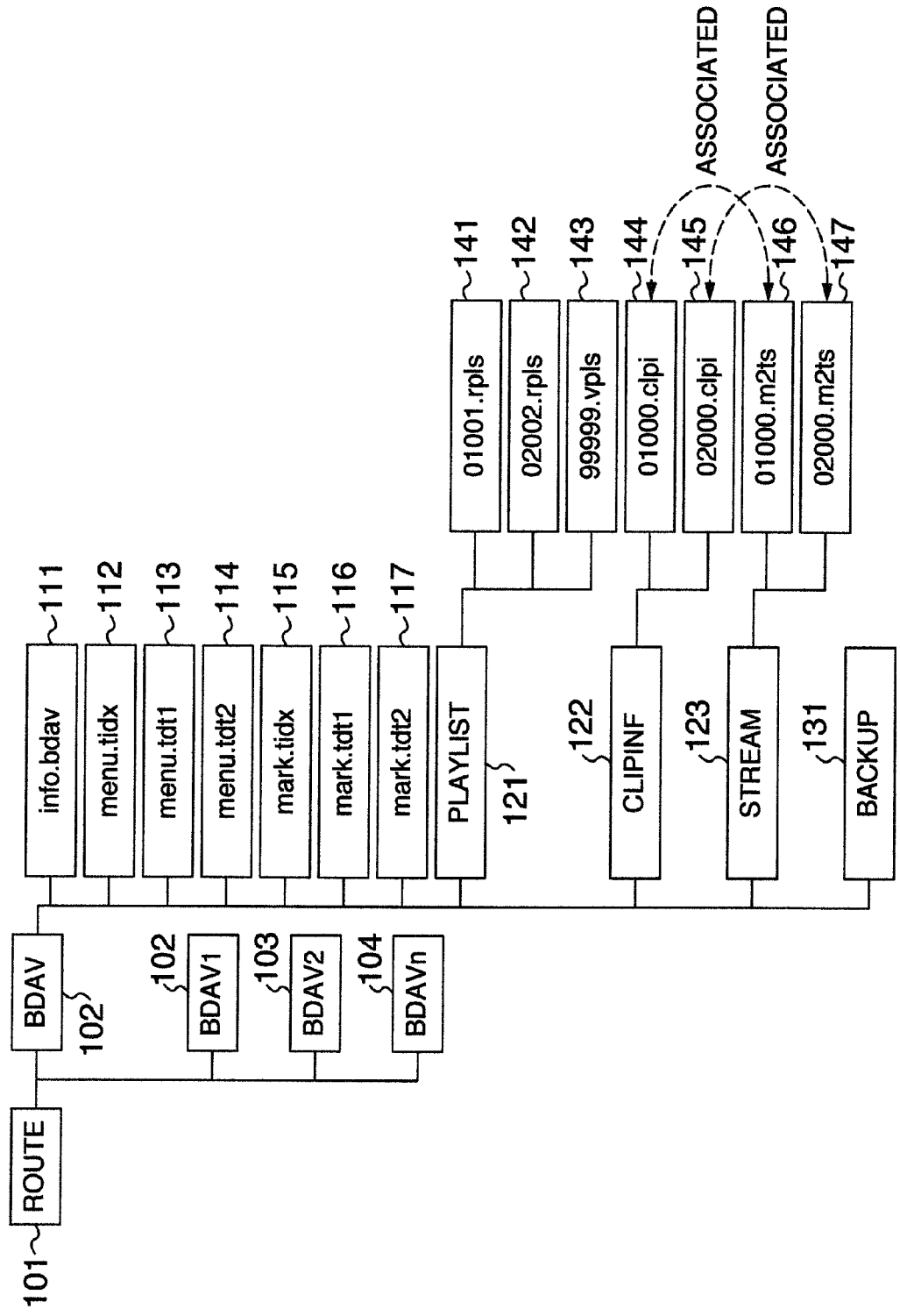
FIG. 1 is a schematic diagram of a directory structure and a file structure.

FIG. 1 is a schematic diagram of a directory structure and a file structure showing a method of an embodiment of the present invention.

Reference numeral 101 denotes a route directory including at least a BDAV directory 101.

Reference numeral 102 denotes a BDAV directory including a PLAYLIST directory 121, a CLIPINF directory 122, a STREAM directory 123, and a BACKUP directory 131.

The route directory 101 includes external BDAV directories such as a BDAV1 directory 102, a BDAV2 directory 103, and a BDAVn directory 104. Herein, "n" of the BDAVn directory 104 is a natural number corresponding to the number of the external BDAV directories and continued from 1. For example, when four external BDAV directories are present under the route directory 101, "n" is 4, and the directory names thereof are BDAV1, BDAV2, BDAV3, and BDAV4, respectively.

The PLAYLIST directory 121 includes management files such as real play list files 141 and 142 and a virtual play list 143.

The CLIPINF directory 122 includes management files such as clip information files 144 and 145.

The STREAM directory 123 includes stream files such as stream files 146 and 147.

An info.bdav file 111 is a file storing general information, and such a file is stored in each BDAV directory.

In a menu.tidx file 112, header information of menu thumbnails is stored.

In a menu.tdt1 file 113, picture data of the menu thumbnails is stored. A menu.tdt2 file 114 is also a similar file.

In a mark.tidx file 115, header information of mark thumbnails is stored.

In a mark.tdt1 file 116, picture data of the mark thumbnails is stored. A mark.tdt2 file 117 is also a similar file.

A 01001.rpls file 141 includes information about a real play list. One rpls file is generated per one real play list. A 02002.rpls file 142 is also a similar file.

A 99999.vpls file 143 includes the information about a virtual play list. One vpls file is generated per one virtual play list.

A 01000.clpi file 144 is a clip information file and includes the clip information related to AV stream files (clip AV stream file, bridge clip AV stream file). A 02000.clpi file 145 is also a similar file.

A 01000.m2ts file 146 is an AV stream file and includes a MPEG-2 transport stream. A 02000.m2ts file 147 is also a similar file.

In the file names of a clip information file zzzzz.clpi and an AV stream file zzzzz.m2ts, "zzzzz" is a five-digit integer, and the same five-digit integer is imparted to the clip information file and the AV stream file associated therewith.

A set of the clip information file zzzzz.clpi and the AV stream file zzzzz.m2ts is referred to as a clip.

As described above, a play list is a file stored in a PLAYLIST directory.

Hereinafter, the real play list file and the virtual play list file will be explained in detail.

Both of the real play list and the virtual play list are composed of the data described below.

FIG. 2 is a diagram showing the structure of a play list file.

Reference numeral 201 denotes a type identifier, in which the information indicating that this file is a play list file is stored. For example, when the value "PLST" is set by the ASCII codes, the file can be distinguished to be a play list file.

Reference numeral 202 denotes a version number, which is the number representing the version of the play list file. Setting a value "0100" by the ASCII codes indicates that H.264 streams are not referenced.

Reference numeral 203 denotes a play list information starting address, at which the value indicating, by byte units, the relative starting position of play list information in the play list file is set. The top thereof starts from 0.

Reference numeral 204 denotes a play list mark information starting address, at which the value indicating, by byte units, the relative starting position of play list mark information in the play list file is set. The top thereof starts from 0.

Reference numeral 205 denotes a manufacturer's unique data starting address, at which the value indicating, by byte units, the relative starting position of manufacturer's unique data information in the play list file is set. The top thereof starts from 0. When 0 is set as this value, manufacturer's unique data information is not present.

Reference numeral 206 denotes user interface application information having the data structure as shown in FIG. 3.

Reference numeral 207 denotes play list information having the data structure as shown in FIG. 5.

Reference numeral 208 denotes the play list mark information.

Reference numeral 209 denotes the manufacturer's unique data.

FIG. 3 is a diagram showing the structure of the user interface application information. The parameters for a user interface application of the play list is stored therein.

Reference numeral 301 denotes a length indicating the length from immediately after this field to the end of the user interface application information.

Reference numeral 331 denotes a 3D flag. If 1 is set thereat, the flag indicates that the contents included in the play list include 3D (stereoscopic view) contents. If 0 is set thereat, the flag indicates that no 3D contents are included.

Reference numeral 302 denotes a character code defining the character code used by a channel name 314, a play list name 316, and a play list detail 318. The character code is also applied to the character code of the mark name of the play list mark information. For example, Japanese is set if the character code is 1, the ASCII codes are set if the character code is 16, and Unicode is set if the character code is 32.

Reference numeral 303 denotes a reproduction protection flag, wherein, if 1 is set, the play list name, the play list information such as thumbnails, and the play list will not be reproduced nor displayed for a user. If authentication by password input succeeds, they will be reproduced. If 0 is set, they can be reproduced without the password input.

Reference numeral 304 denotes a recording protection flag, wherein, if 1 is set, neither change nor deletion of the play list information is allowed except that for the recording protection flag. If 0 is set, change and deletion by the user can be freely carried out. If 1 is set, a recorder should make a reconfirmation with respect to the user before the user carries out deletion, editing, or overwriting of the play list information. A real play list in which the recording protection flag is set to 0 and a virtual play list in which the recording protection flag is set to 1 sometimes share a same part of a clip. In this case, when the user tries to delete the real play list, the recorder should make a reconfirmation with respect to the user before deletion of the real play list.

Reference numeral 305 denotes a reproduction-done flag, wherein, if 1 is set, the flag indicates that this play list has been reproduced at least one time. If 0 is set, it indicates that the play list has never been reproduced.

Reference numeral 306 denotes an editing-done flag, wherein, if 0 is set, the flag indicates that the original data same as that upon recording is saved without being changed. If 1 is set, the flag indicates that the data has been changed.

Reference numeral 307 denotes a time zone having the data structure as shown in FIG. 4.

FIG. 4 is a schematic diagram showing the structure of the time zone.

Reference numeral 401 denotes padding for alignment.

Reference numeral 402 denotes a summer time flag, wherein, if 0 is set, the flag indicates that it is standard time. If 1 is set, the flag indicates that it is summer time.

Reference numeral 403 denotes a time zone code, wherein, if 0 is set, the code indicates a positive value. If 1 is set, the code indicates a negative value.

Reference numeral 404 denotes a time zone value representing the absolute value of the time of the difference from UTC (coordinated universal time). The unit thereof is time (=60 minutes). If 15 is set, the time zone value is invalid, and 15 indicates that the summer time flag, the time zone code, and also a 30-minute flag are invalid.

Reference numeral 405 is a 30-minute flag, wherein, if 1 is set, the flag indicates that the time zone value further has 30-minute additional difference time in an absolute value. If 0 is set, the 30-minute flag indicates that the time zone value has no additional time.

Reference numeral 308 denotes recorded date and time including the information about the date and time at which the play list was recorded. The time is shown by local time. The year, month, date, hour, minute, and second thereof are expressed by BCD (Binary Coded Decimal) wherein four bits represents one digit. The first four digits thereof represent the four digits of the Christian year.

Reference numeral 309 denotes a play list length representing the length of the play list by time unit. This length is obtained by the total reproduction time of play items included in the play list. The reproduction time of the play items is the time from IN time to OUT time. The unit thereof is rounded to seconds. The hour, minute, and second thereof are expressed by BCD wherein four bits represent one digit.

Reference numeral 310 denotes a manufacturer ID indicating the manufacturer of the recorder by which the play list was updated last time.

Reference numeral 311 denotes a manufacturer model code representing the model number of the recorder by which the play list was updated last time.

Reference numeral 312 denotes a channel number, which is a broadcasting channel number or a service number selected by the user when the play list was recorded. In the case of a play list obtained by joining two or more play lists, the value thereof represents a representative value. This value is a value of 999 or less. If 0xFFFF is set, this number is invalid.

Reference numeral 313 denotes a channel name length representing the byte length of the channel name. The channel name length is a value of 20 or less.

Reference numeral 314 denotes the channel name representing a broadcasting channel name or a service name selected when the user recorded the play list. The byte length, which is indicated by the channel name length 313, from the left end of this field is valid.

Reference numeral 315 denotes a play list name length indicating the byte length of the play list name. The play list name length is a value of 255 or less.

Reference numeral 316 denotes the play list name and includes a play list name. The byte length, which is indicated by the play list name length 315, from the left end of this field is valid.

Reference numeral 317 denotes a play list detail length representing the byte length of the play list detail. The play list detail length has a value of 1200 or less.

Reference numeral 318 denotes the play list detail including the detailed text information of the play list. The byte length, which is indicated by the play list detail length 317, from the left end of this field is valid.

FIG. 5 is a diagram showing the structure of the play list information.

Reference numeral 501 denotes a length representing the length from immediately after this field to the end of the play list information.

Reference numeral 502 denotes a play list CPI type, which is the type of the access points referenced from the IN time or OUT time in the play item, and is the access point type of a mark time stamp in the play list mark. If 1 is set, it indicates that each access point in the play list information indicates the display time in an AV stream file and is referred to as the play list information of an EP_map type. If 2 is set, it indicates that each access point indicates arrival time and is referred to as the play list information of a TU_map type.

Reference numeral 503 denotes the number of the play items representing the number of the play items in the play list. Play item ID is an integer starting from 0. The entries of the play items in the play list are sorted in the order of display.

Reference numeral 504 denotes the number of sub play items representing the number of the sub play items in the play list.

FIG. 6 is a diagram showing the structure of the play item.

Reference numeral 601 denotes a length representing the length from immediately after this field to the end of the play item information.

Reference numeral 602 denotes a clip information file name representing the name of a clip information file of the clip used by the play item information. This field shows a five-digit number zzzzz of a file name zzzzz.clpi. The name is expressed by a character string of the ASCII codes. A clip stream type field in the clip information file shows a clip AV stream file (MPEG-2 transport stream).

Reference numeral 603 denotes clip CODEC information, and this field has the value representing "M2TS" of the ASCII codes. All the play items in the play list information have the clip CODEC information "MTS" of the same value. If the play list CPI type in the play list information is set to 1 and the clip CODEC information is set to "M2TS", each clip used in the play list file has EP_map in CPI information. If the play list CPI type in the play list information is set to 2 and the clip CODEC information is set to "M2TS", each clip used in the play list file has TU_map in CPI information.

Reference numeral 604 denotes a connection condition representing the connection condition between the IN time of a current play item and the OUT time of an immediately-previous play item. The condition is represented by any of the values from 1 to 6. If the play item is a first play item in the play list, the connection condition field is invalid, and 1 is set therein.

Reference numeral 605 denotes STC information, wherein, if the CPI type in the CPI information of the clip information file is EP_map, the STC information represents STC_ID of an STC sequence including a presentation unit of the current play item. The clip referenced by the clip information file name of the current play item has the STC sequence. The value of STC_ID is defined in the sequence information of the clip.

Reference numeral 606 denotes IN time representing the IN time of the current play item, in other words, representing the display start time of the current play item. The meaning of the IN time is different depending on the CPI type in CPI of the clip information file referenced by the clip information file name.

Reference numeral 607 denotes OUT time representing the OUT time of the current play item, in other words, representing the display end time of the current play item. The meaning of the OUT time is different depending on the CPI type in CPI of the clip information file referenced by the clip information file name.

In the case of EP_map, the IN time and the OUT time indicates the display time based on the STC time of the clip used by the play item. The time is measured by a 45 kHz clock unit. For example, the time is expressed by the higher 32 bits of 33-bit PTS of 90 kHz accuracy with respect to a presentation unit. Furthermore, the period from the IN time to the OUT time does not include discontinuous points of system time. Furthermore, the OUT time indicates the time ahead of the IN time. However, if wraparound is carried out, the IN time becomes larger than the OUT time.

In the case of TU_map, the IN time and the OUT time indicates the time of TU_time_base same as an ATC sequence of the clip referenced by the clip information file name of the play item. Furthermore, the IN time and the OUT time is measured by the 45 kHz clock. Furthermore, the OUT time is larger than the IN time.

Reference numeral 608 denotes bridge sequence information, and the details thereof will be explained by FIG. 7.

FIG. 7 is a diagram showing the structure of the bridge sequence information.

Reference numeral 701 denotes a bridge sequence information file name representing the name of a clip information file of a bridge clip used by the bridge sequence information. This field includes a five-digit numerical value (corresponding to zzzzz of the file name) described by the ASCII codes. A clip stream type in the clip information of the clip information file is a bridge clip AV stream (MPEG-2 transport stream).

Reference numeral 702 denotes clip CODEC information having the value "M2TS" by the ASCII codes indicating that the play list file uses an MPEG-2 transport stream. The bridge clip used by the bridge sequence information has EP_map as CPI.

FIG. 8 is a diagram showing the structure of the sub play item.

Reference numeral 801 denotes a length which is the byte length from immediately after this field to the end of the sub play item.

Reference numeral 802 denotes a clip information file name representing the name of a clip information file of a clip used by the sub play item. This field has a five-digit number by the ASCII code corresponding to zzzzz of the name of the clip. The clip stream type in the clip information of the clip information file indicates "clip AV stream (MPEG-2 transport stream)".

Reference numeral 803 denotes clip CODEC information having the value "M2TS" by the ASCII codes and indicating that an MPEG-2 transport stream is used by the play list file. The clip used by the sub play item has EP_map in CPI.

Reference numeral 804 denotes a sub play item type indicating the type of a sub path used by the sub play item, wherein only the value of 1 is set. A clip AV stream of a voice stream for postrecording is used.

Reference numeral 805 denotes STC_ID representing STC_ID corresponding to a STC sequence of the clip indicated by the clip information file name referenced by the sub play item. Both of sub play item IN time and sub play item OUT time of the sub play item indicate a presentation unit in the same STC sequence referenced by STC_ID.

Reference numeral 806 denotes the sub play item IN time having the display start time of the sub play item. The sub play item IN time is the display time measured at 45 kHz accuracy by the STC of the clip used by the sub play item.

Reference numeral 807 denotes sub play item OUT time having the display end time of the sub play item. The sub play item OUT time is the display time measured at 45 kHz accuracy by the STC of the clip used by the sub play item. The sub play item OUT time indicates the time ahead of the sub play item IN time. If wraparound of the STC is carried out between the sub play item IN time and the sub play item OUT time, the sub play item IN time becomes larger than the sub play item OUT time. Both of the sub play item IN time and the sub play item OUT time indicate the display time of the period between the display start time and the display end time corresponding to the STC sequence referenced by STC_ID of the sub play item.

Reference numeral 808 denotes synchronization play item ID indicating the play item ID of the play item in the play list. The play item includes a sub play item, and reproduction of the sub play item is started within the reproduction time of the play item. The play item ID is determined by a play list in the play list.

Reference numeral 809 denotes synchronization play item start PTS indicating the display time in the play item indicated by the synchronization play item ID. The sub play item starts display of the sub play item per se when the display time of the play item reaches the synchronization play item start PTS. The synchronization play item start PTS is the display time measured by the 45 kHz clock of the play item indicated by the synchronization play item ID.

First, a recording apparatus will be explained by using FIG. 9 and FIG. 10.

Figure 9:
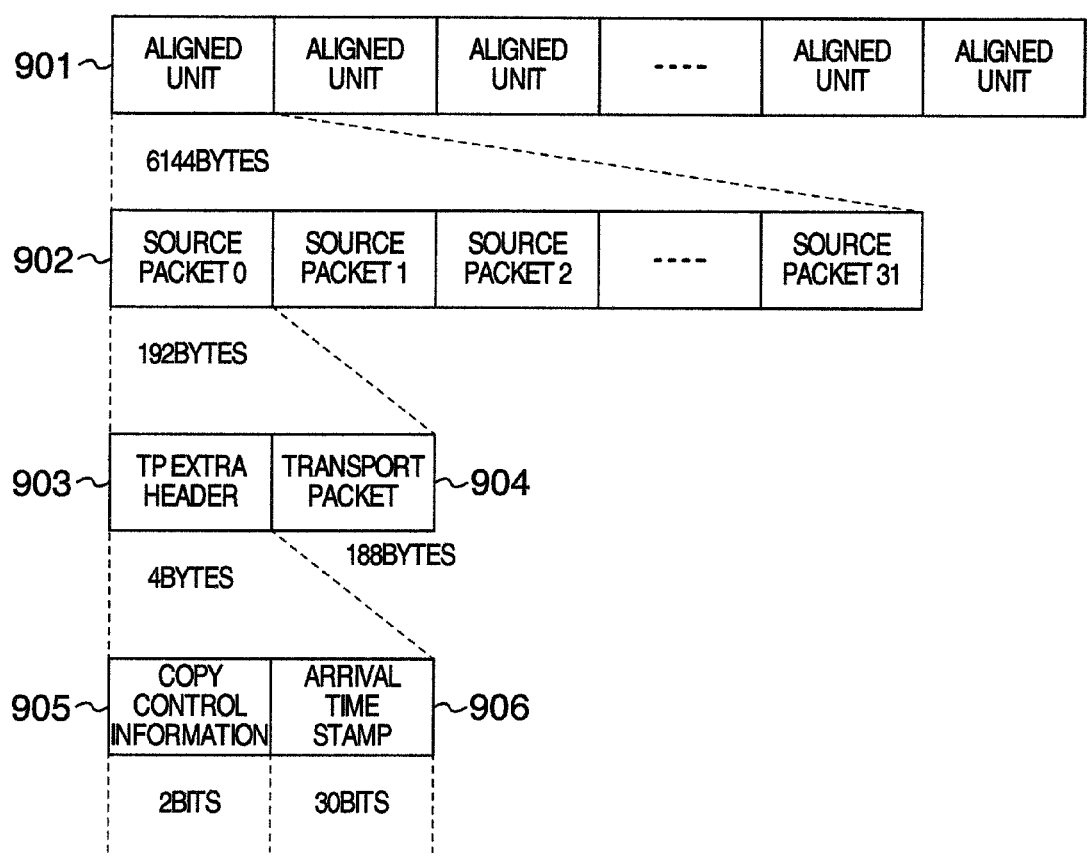
FIG. 9 is a schematic diagram showing the structure of an MPEG-2 transport stream.

FIG. 9 is a diagram showing the structure of an MPEG-2 transport stream.

An AV stream file has the structure of the MPEG-2 transport stream. The MPEG-2 transport stream is composed of a natural number of aligned units 901. The aligned unit 901 has a size of 6144 bytes (=2048×3 bytes). The aligned unit 901 starts from a first byte of a source packet 902. The length of the source packet 902 is 192 bytes. Each of the source packets is composed of a TP extra header 903 and a transport packet 904. The length of the TP extra header 903 is 4 bytes, and the length of the transport packet 904 is 188 bytes. Each of the aligned units 901 is composed of 32 source packets 902. The last aligned unit 901 in the MPEG-2 transport stream is composed of 32 source packets 902. Therefore, the MPEG-2 transport stream is terminated by the end of the aligned unit 901. If not all of the last aligned unit 901 is filled with the input transport stream, the remaining bytes are filled with the transport packets of PID=0x1FFF, in other words, source packets of null packets.

The transport packet 904 is defined by ISO/IEC 13818-1.

The TP extra header 903 is composed of copy permission information 905 and an arrival time stamp 906. The copy permission information 905 includes contents protection information of the relevant transport packet 904. In the arrival time stamp 906, the value of a later-described arrival time stamp is set.

Figure 10:
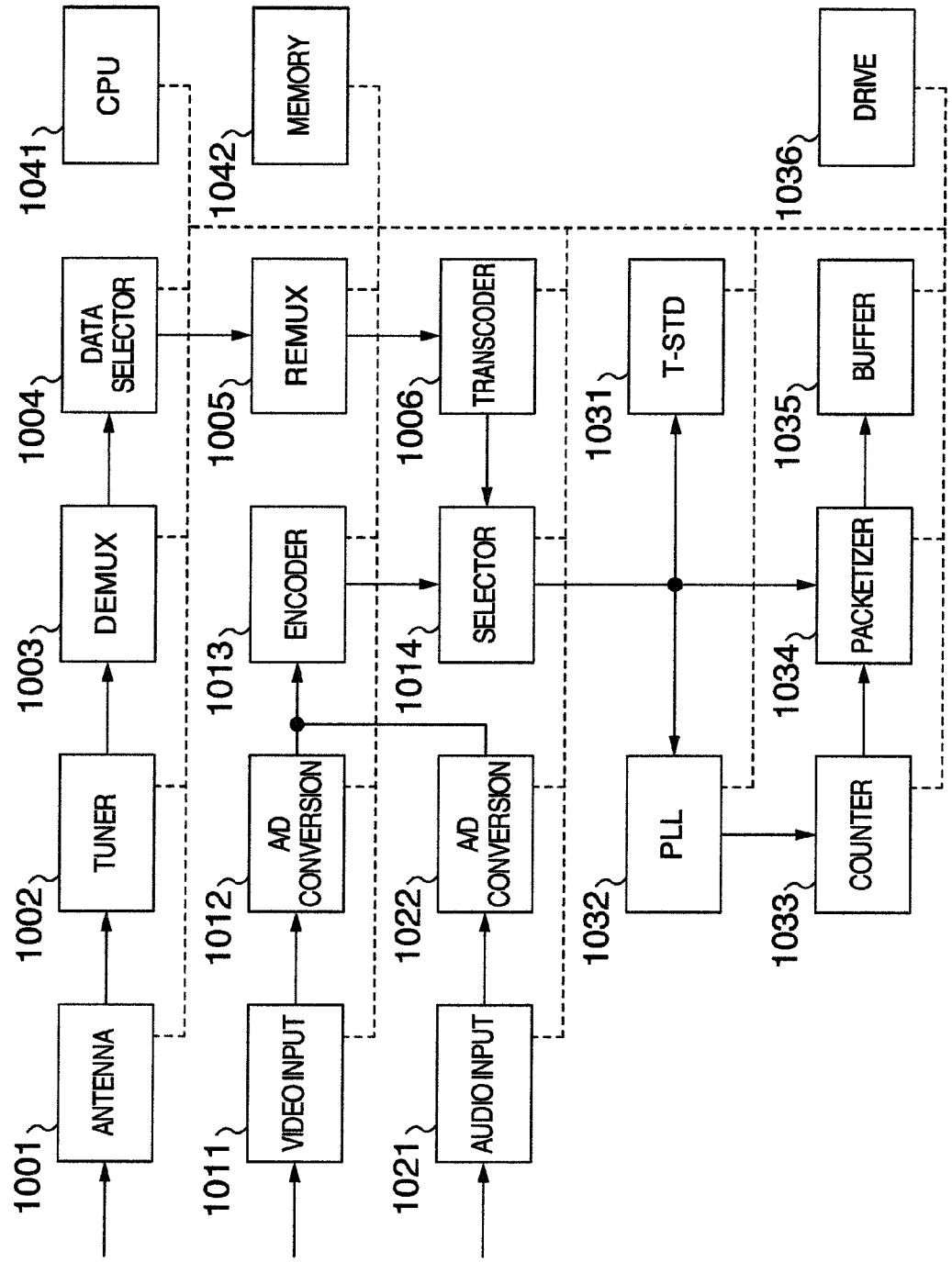
FIG. 10 is a schematic diagram of a recorder showing a system of an embodiment.

FIG. 10 is a schematic diagram of a recorder showing a method of an embodiment of the present invention.

Reference numeral 1001 denotes an antenna to which digital broadcasting waves are input.

Reference numeral 1002 denotes a tuner, which receives the digital broadcasting waves input from the antenna 1001.

Reference numeral 1003 denotes DEMUX, which separates the digital broadcasting waves (full TS (Transport Stream)) received by the tuner 1002 into elementary streams in accordance with needs.

Reference numeral 1004 denotes a data selector, which selects a necessary stream from the elementary streams separated by the DEMUX 1003 in accordance with needs.

Reference numeral 1005 denotes REMUX, which multiplexes the stream transmitted from the data selector with the MPEG-2 transport stream again in accordance with needs, thereby forming a partial TS (Transport Stream).

Reference numeral 1006 denotes a transcoder, which converts the formats of the audio streams and video streams of the TS input from the REMUX 1005 in accordance with needs.

Reference numeral 1011 denotes a video input to which analog video signals are input.

Reference numeral 1012 denotes A/D conversion, wherein the analog data input from the video input 1011 is converted to digital data.

Reference numeral 1021 denotes an audio input to which analog audio signals are input.

Reference numeral 1022 denotes A/D conversion, wherein the analog data input from the audio input 1021 is converted to digital data.

Reference numeral 1013 denotes an encoder, which encodes the video data and the audio data, which is digitized by the A/D conversion 1012 and 1022, into MPEG-2 transport streams.

Reference numeral 1014 denotes a selector, which switches and inputs the streams transmitted from the transcoder 1006 or the encoder 1013.

Reference numeral 1031 denotes T-STD which is a transport system target decoder to which the MPEG-2 transport streams of time i are input.

Reference numeral 1032 denotes PLL at which synchronization with the PCR (Program Clock Reference) of the input MPEG-2 transport streams which is a frequency of 27 MHz is carried out.

Reference numeral 1033 denotes a counter, which is a binary counter which counts the pulse signals of the frequency of 27 MHz. The counter passes the count value i at the time i to a packetizer 1034 as an arrival time clock (i).

Reference numeral 1034 denotes the packetizer, which adds TP extra headers to all the transport packets and generates source packet streams and aligned units. The generated source packet streams are transferred to a write buffer 1035 at a maximum transfer rate RMAX. The packetizer 1034 has a small-capacity buffer in the interior thereof and averages the bit rates of the streams. Sometimes, the peak rate of digital broadcasting exceeds RMAX; however, the transfer rate to the write buffer 1035 is ensured to be RMAX or less by the buffer therein.

The arrival time stamp is the time at which the first byte of a source packet arrives at the T_STD 1031 and the packetizer 1034. The arrival time stamp (k) is a sample value of an arrival time clock (k) (see below expression).

$$\text{Arrival Time Stamp}(k) = \text{Arrival Time Clock}(k) \% \text{ (2 to the 30th power)}$$

The maximum value of the difference between the arrival time stamps of two continuous packets is $(2^{30}-1)/27000000$ seconds (=about 40 seconds).

If the difference exceeds this value, the arrival time stamps are changed so that the difference becomes this maximum value. The recorder has to be prepared for such a case. When a later-described MPEG-2 transport stream player outputs the transport stream in accordance with the arrival time stamps, the PCR accuracy of the output transport stream is defined by ISO/IEC13818-9.

Reference numeral 1035 denotes a buffer, which is a write buffer for writing the source packets, which have been transferred from the packetizer 1034, to a drive 1036. The value of RMAX is determined by a TS recording rate defined in the clip information of the AV stream file. This RMAX is calculated in the manner described below.

$$RMAX = TS \text{ Recording Rate} \times 192/188$$

The unit of the TS recording rate is byte/second.

If the maximum recording rate of the drive is RUD and the buffer 1035 is not empty, the recording rate with respect to the drive 1036 is RUD; and, if the buffer 1035 is empty, the recording rate with respect to the drive 1036 is 0. The buffer 1035 is not overflowed.

Reference numeral 1036 denotes the drive, which writes the streams, which have been input from the write buffer 1035, to a recording medium such as an optical disk at the maximum recording rate RUD.

Reference numeral 1041 denotes a CPU, which controls recording of the entire recorder. The CPU is connected to the blocks in the recorder by a CPU bus shown by a broken line and carries out transmission/reception and control of data.

Reference numeral 1042 denotes a memory, which is used as a work memory of the CPU 1041, a buffer of the encoder, and the like.

Figure 37:
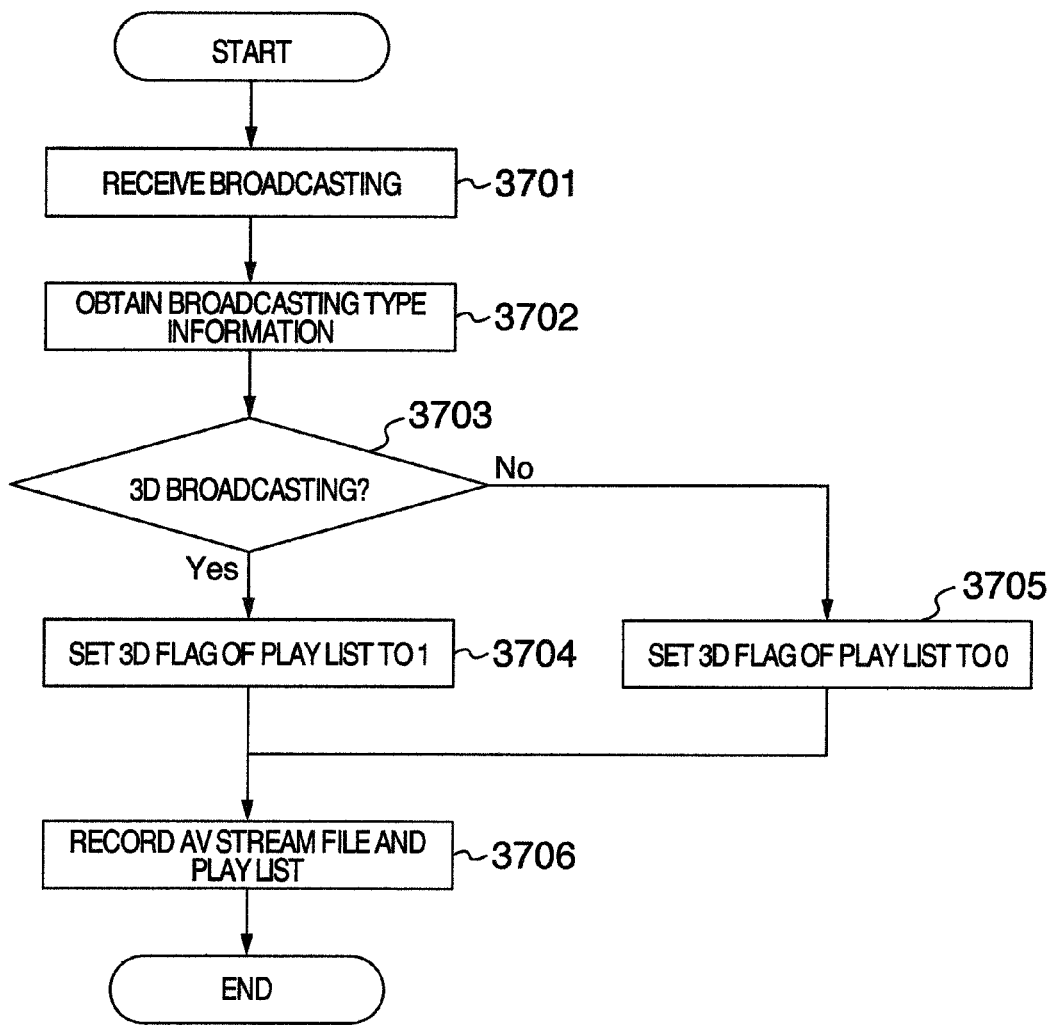
FIG. 37 is a flow chart of a 3D flag recording process.

Furthermore, a recording process flow of the 3D flag will be explained by using FIG. 37.

When recording of a broadcast program is started, the stream data of the program received/selected by the tuner 1002 via the antenna 1001 is subjected to a separating process by the DEMUX 1003 (step 3701).

Then, via the data selector 1004, the CPU 1041 obtains the program attribution information on whether the data is 3D broadcasting or not contained in the SI information (step 3702).

Based on the information whether the obtained information on whether the data is 3D information or not, the CPU 1041 determines whether the program is a program of 3D contents or not (step 3703) and calculates the value to be set at the 3D flag 331 of the user interface application information 206 of the play list file 141. If the program to be recorded is 3D broadcasting, 1 is set; otherwise, 0 is set (step 3704, step 3705). The play list file 141 is recorded together with the AV stream file 146 and the clip information file 145 on the recording medium by the drive 1036 (step 3706).

Next, a reproducing apparatus will be explained by using FIG. 11.

Figure 11:
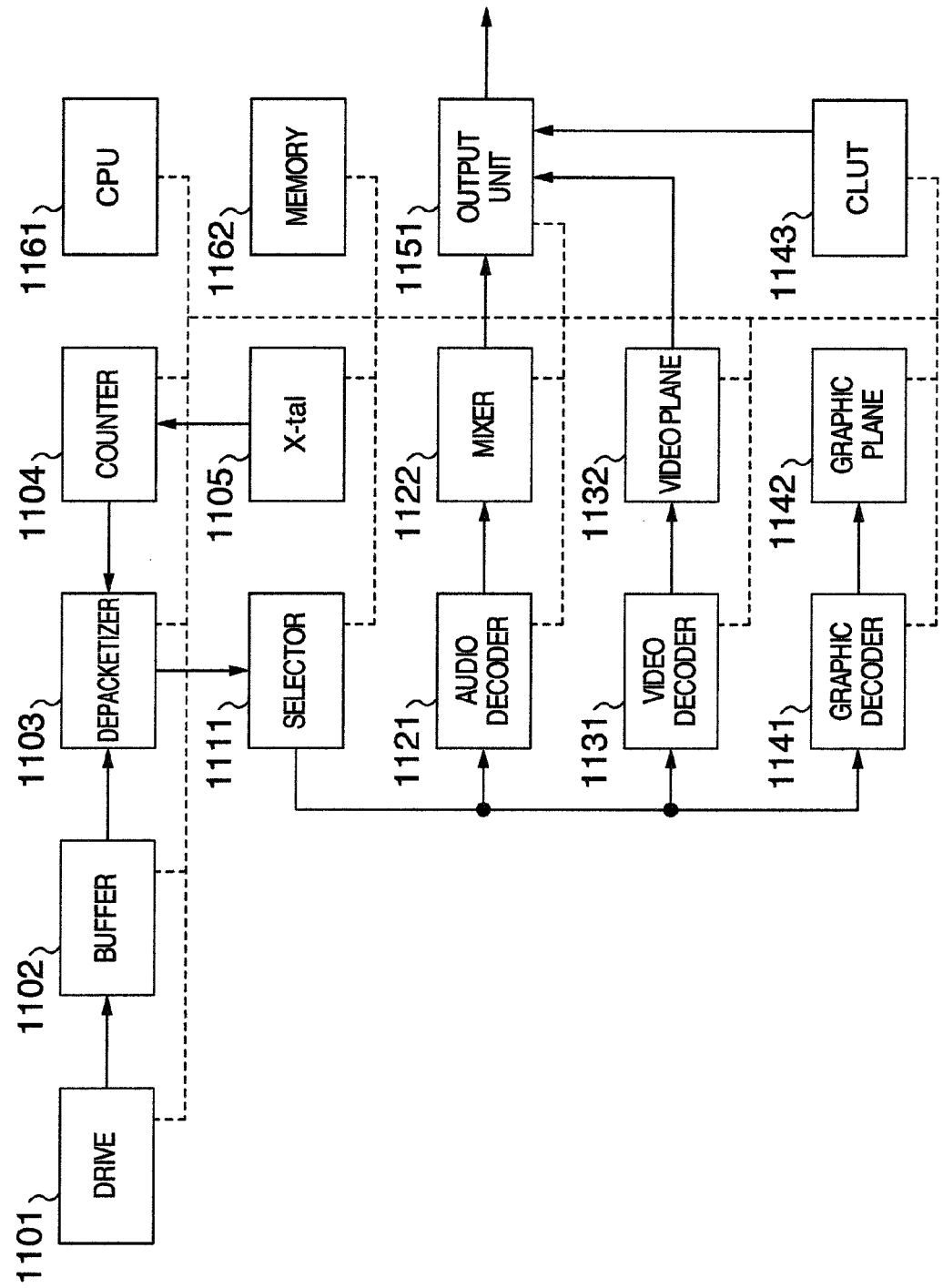
FIG. 11 is a schematic diagram of a player showing a system of an embodiment.

FIG. 11 is a schematic diagram of a player showing a system of an embodiment of the present invention.

Reference numeral 1101 denotes a drive, which reads MPEG-2 transport streams from a recording medium such as an optical disk and transfers the streams to a buffer 1102.

Reference numeral 1102 denotes the buffer, which buffers the MPEG-2 transport streams read from the drive 1101.

Reference numeral 1103 denotes a depacketizer, which separates the MPEG-2 transport streams, which have been input from the buffer 1102, into TP extra headers and transport packets, synchronizes the arrival time stamps thereof with an arrival time clock input from a counter 1104, and outputs the transport packets. An initial value of the arrival time clock is given to the counter 1104 at the beginning.

Reference numeral 1104 denotes the counter, which starts from the initial value received from the depacketizer 1103, counts the pulse signals of 27 MHz from X-tal 1105, and passes arrival time clocks to the depacketizer 1103.

Reference numeral 1105 denotes the X-tal, which generates the pulse signals of 27 MHz.

Reference numeral 1111 denotes a selector, which switches the transport packets, which have been input from the depacketizer 1103, depending on the types thereof and passes the packets to corresponding decoders.

Reference numeral 1121 denotes an audio decoder, which decodes the audio packets input from the selector 1111 and passes the packets to a mixer 1122.

Reference numeral 1122 denotes the mixer, which carries out mixing of, for example, volume setting of multi-channel audio at a specified rate in accordance with needs.

Reference numeral 1131 denotes a video decoder, which decodes the video packets input from the selector 1111 and passes the packets to a video plane 1132.

Reference numeral 1132 denotes the video plane, which is a plane buffer for deploying the picture data decoded by the video decoder 1131 and displaying the data.

Reference numeral 1141 denotes a graphic decoder, which decodes the graphic packets input from the selector 1111 and passes the packets to a graphic plane 1142.

Reference numeral 1142 denotes the graphic plane, which is a plane buffer which deploys the graphic data input from the graphic decoder 1141.

Reference numeral 1143 denotes a CLUT (Color Look Up table), which is a table for referencing the RGB data and alpha blend data corresponding to the pixels of the graphic plane 1142.

Reference numeral 1151 denotes an output unit, which multiplexes the input audio/video/graphic data and outputs the data to the outside from the player by an analog format such as YCbCr or a digital format such as HDMI.

Reference numeral 1161 denotes a CPU, which controls reproduction of the entire player. The CPU is connected to the blocks in the recorder by a CPU bus shown by broken lines and carries out transmission/reception and control of data.

Reference numeral 1162 denotes a memory, which is used as a work memory of the CPU 1161, a buffer of the decoder, and the like.

Figure 38:
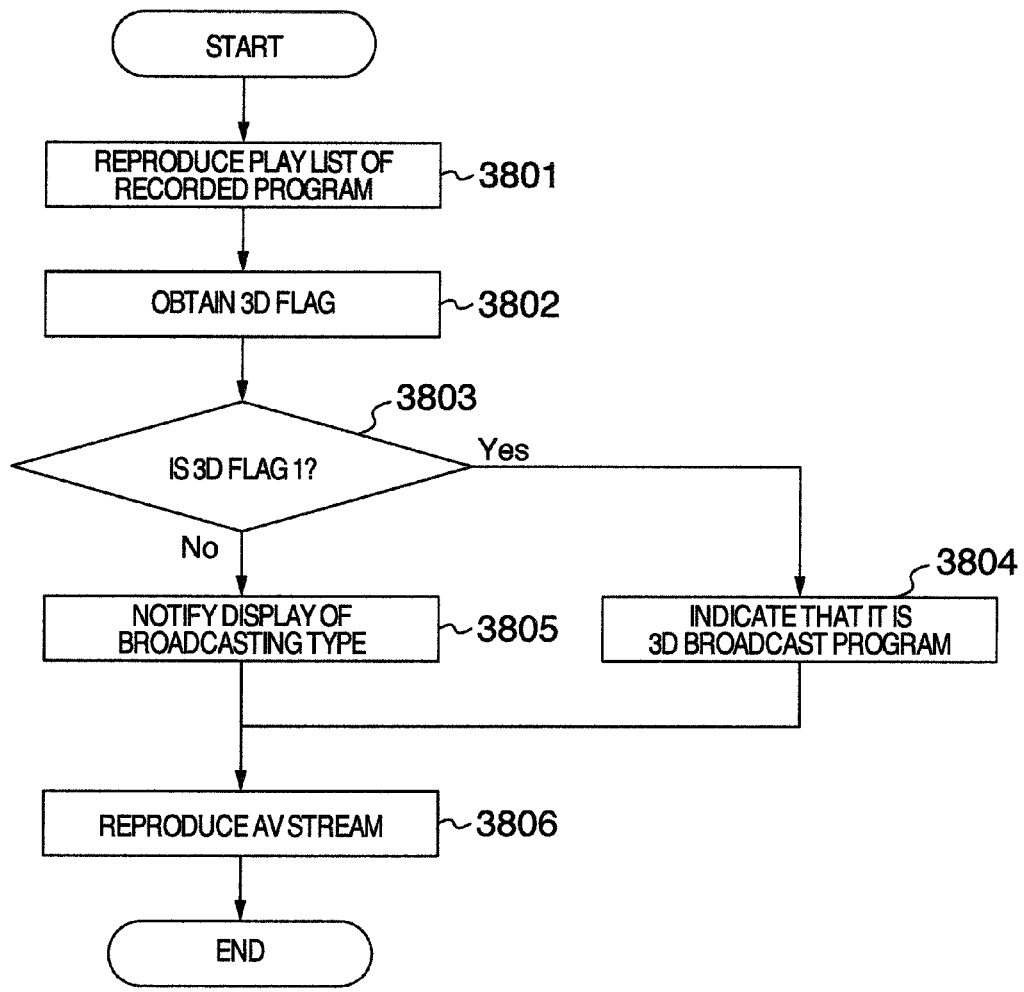
FIG. 38 is a flow chart of a 3D flag reproducing process.

Furthermore, a reproduction process flow of the 3D flag will be explained by using FIG. 38.

When a user selects a program that the user desires to watch from a recorded program list of the recorder, the drive 1101 reproduces the play list file 141, which is corresponding to the reproduction program, from a recording medium (step 3801).

The CPU 1161 obtains the 3D flag 331 of the user interface application information 206 from the reproduced play list file 141 (step 3802) and determines whether the 3D flag 331 is 1 or not (step 3803).

If the 3D flag 331 is 1, the user is notified that the program is 3D contents, for example, by OSD (On Screen Display) or LED indicator lighting of the recorder main body (step 3804).

Furthermore, a display connected to the recorder is notified that the 3D contents are to be transmitted thereto (step 3805), the display makes a transition to a 3D display mode.

Then, an AV stream file is reproduced (step 3806).

Figure 12:
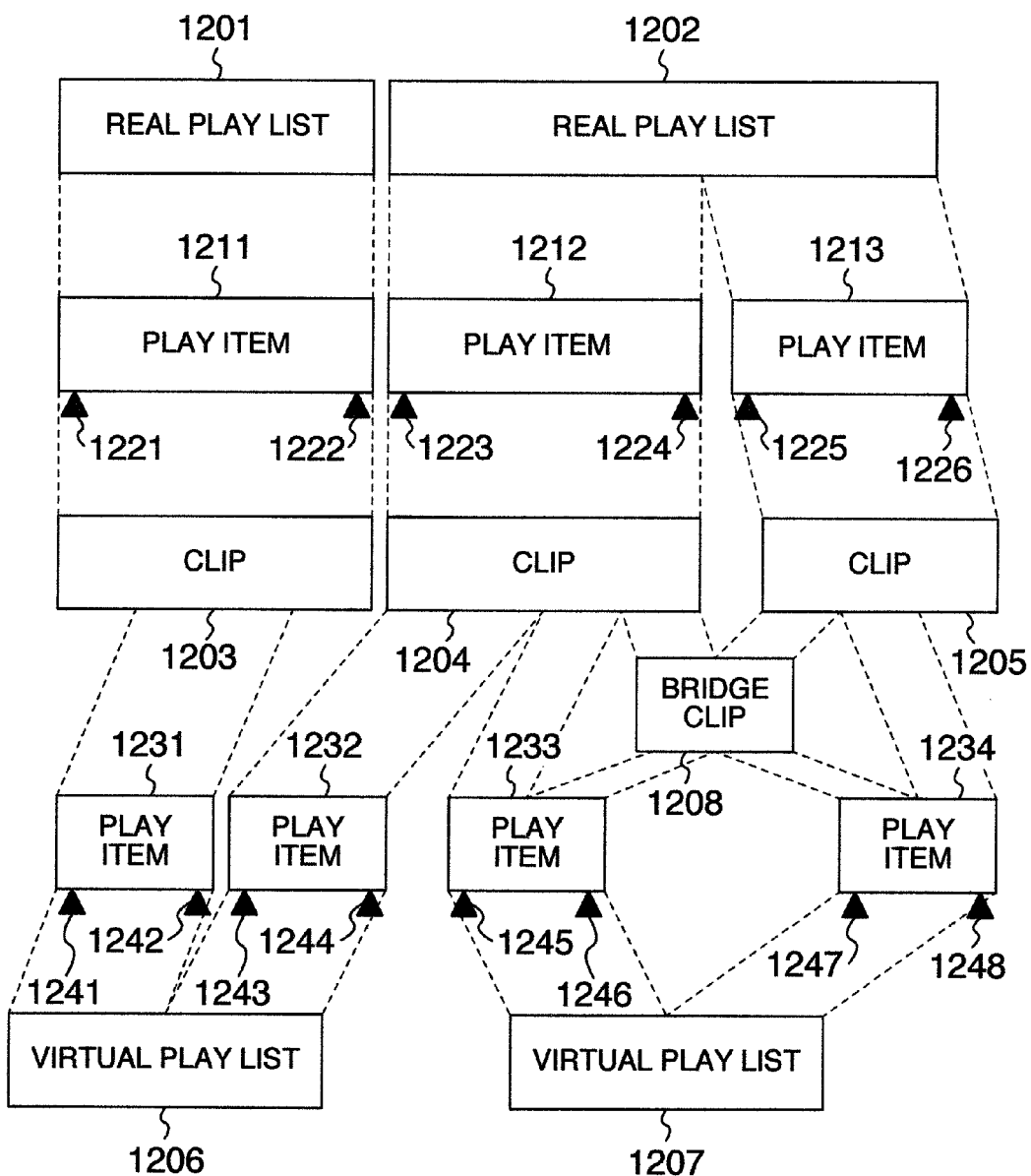
FIG. 12 is a schematic diagram showing real play lists and virtual play lists.

FIG. 12 is a schematic diagram of real play lists and virtual play lists showing a method of an embodiment of the present invention.

Reference numeral 1201 denotes a first real play list referencing a play item 1211.

Reference numeral 1202 denotes a second real play list referencing a play item 1212 and a play item 1213.

Reference numeral 1211 denotes a first play item referencing a clip 1203.

Reference numeral 1212 denotes a second play item referencing a clip 1204.

Reference numeral 1213 denotes a third play item referencing a clip 1205.

Reference numeral 1203 denotes a first clip.
Reference numeral 1204 denotes a second clip.
Reference numeral 1205 denotes a third clip.

Reference numeral 1231 denotes a fourth play item referencing part of the clip 1203.

Reference numeral 1232 denotes a fifth play item referencing part of the clip 1204.

Reference numeral 1233 denotes a sixth play item referencing part of the clip 1204 and part of a bridge clip 1208.

Reference numeral 1234 denotes a seventh play item referencing part of the bridge clip 1208 and part of the clip 1205.

Reference numeral 1206 denotes a first virtual play list referencing the play item 1231 and the play item 1232.

Reference numeral 1207 denotes a second virtual play list referencing the play item 1233 and the play item 1234.

Reference numeral 1208 denotes a first bridge clip re-encoded from the data of an end part of the clip 1204 and the data of a top part of the clip 1205.

The play lists will be explained.

A purpose of the play lists is to enable easily editing the reproduction time of the clips desired to be reproduced by a user. For example, cut/paste editing can be carried out without carrying out movement, copy, and deletion (including partial movement, partial copy, and partial deletion) of the substance of clip files. The play list is a collection of continuous reproduction sections in clips called play items, and each of the play items is expressed by a set of an IN point and an OUT point. The IN point and the OUT point are the time information indicating positions on the time axis owned by the clip. Therefore, it can be said that the play list is a collection of play items. Moreover, the IN point means a reproduction starting position of the reproduction section, and the OUT point means a reproduction end position of the reproduction section. The play lists include two types, i.e., the real play lists and the virtual play lists.

The real play lists will be explained.

The real play list is used for clip AV stream files, but is not used for bridge clip AV stream files. The real play list references the part where clips are present.

The data space on a disk is consumed by the amount of the size of (part of) referenced clips by the reference made by the real play list. When the real play list is deleted, (part of) the referenced clips are deleted.

The virtual play lists will be explained.

The virtual play lists are used for both clip AV stream files and bridge clip AV stream files. When used for the clip AV stream files, the virtual play list does not have the substance of the data thereof; however, when used for the bridge clip AV stream files, the virtual play list has the substance of the data thereof. When the virtual play list not using the bridge clip AV stream files is deleted, the clips are not changed.

On the other hand, when the virtual play list using bridge clip AV stream files is deleted, the clip AV stream files and the clip information files related thereto are not changed, but the bridge clip AV stream files and the clip information files related thereto are deleted.

The clip is a management unit for carrying out internal control of the player or the recorder and is not displayed on a user interface. Only the play lists are shown to the user.

The operations of the play lists include below described operations.

The operations related to the operations of the real play lists include the below described operations.

(1) Generation of Real Play List

A real play list generated at the beginning upon recording of a broadcasted program becomes a real play list referencing the entirety of the recorded clip.

FIG. 13 is a diagram showing an example of the generation of a real play list.

Reference numeral 1301 denotes the real play list referencing a play item 1311. Upon new recording, the real play list is generated as one play list file.

Reference numeral 1311 denotes a play item referencing a clip 1303.

Reference numeral 1303 denotes the clip, which is generated as one clip information file and one AV stream file upon new recording.

FIG. 14 is a table showing the 3D flag of the generated real play list.

Reference numeral 1451 denotes the table showing the set value of the 3D flag in the real play list 1301 upon new recording; wherein 1 is set if the contents of the clip 1303 are 3D, and, otherwise, 0 is set.

(2) Dividing of Real Play List

In the case in which one real play list is divided into two to generate two real play lists, the clip thereof per se is not changed.

Figure 15:
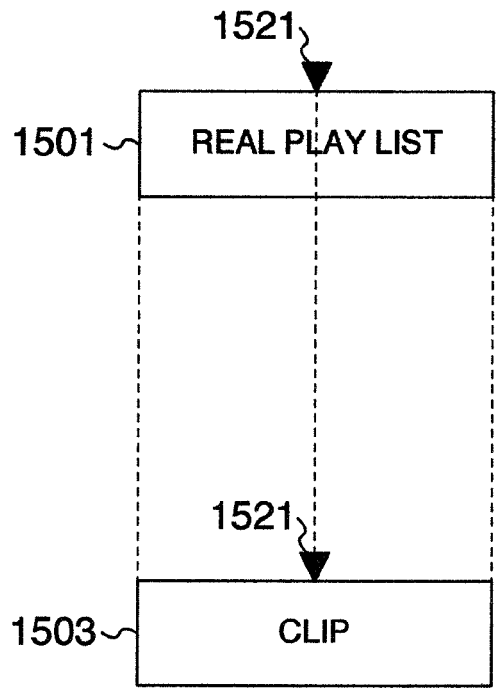
FIG. 15 is a schematic diagram showing an example of dividing of a real play list.
Figure 16:
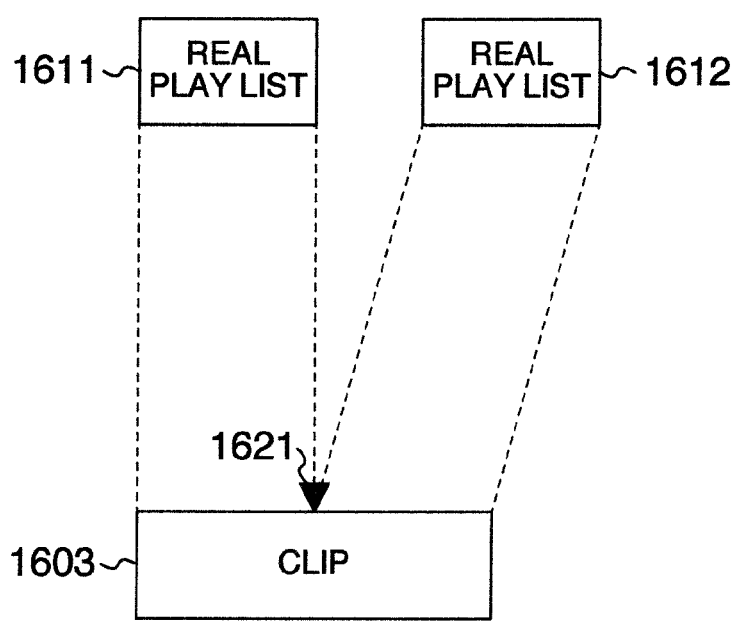
FIG. 16 is a schematic diagram showing the example of the dividing of the real play list.

FIG. 15 and FIG. 16 are diagrams showing an example of dividing of a real play list.

Reference numeral 1501 denotes the real play list referencing a clip 1503 via a play item, which is not shown.

Reference numeral 1503 denotes the clip.

Reference numeral 1521 denotes a dividing point, wherein the example in which the vicinity of the center of the real play list 1401 is divided is shown.

Reference numeral 1611 denotes a real play list referencing part (corresponding to the part in the left of the dividing point 1621) of a clip 1603 via a play item, which is not shown.

Reference numeral 1603 denotes a clip which is the same as the clip 1503.

Reference numeral 1612 denotes a real play list referencing part (corresponding to the part in the right of the dividing point 1621) of the clip 1603 via a play item, which is not shown.

Figures 17, 18:
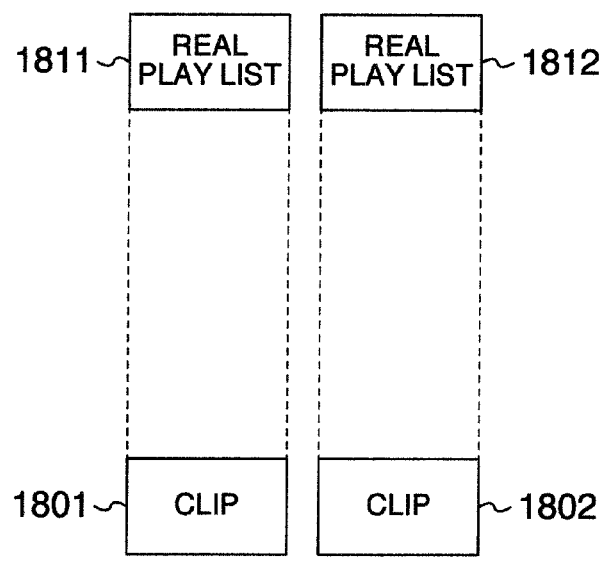
FIG. 17 is a table showing 3D flags before and after the dividing of the real play list.
FIG. 18 is a schematic diagram showing an example of coupling of real play lists.

FIG. 17 is a table showing 3D flags before and after dividing of the real play list.

Reference numeral 1751 denotes the table showing the set values of the 3D flags in the real play lists 1501, 1611, and 1612 before and after the dividing; wherein, 1 is set if the contents of the clip 1503 are 3D, and, otherwise, 0 is set.

(3) Coupling of Real Play lists

When two real play lists are coupled with each other to generate one new real play list, the clips thereof per se are not changed.

Figures 19, 20:
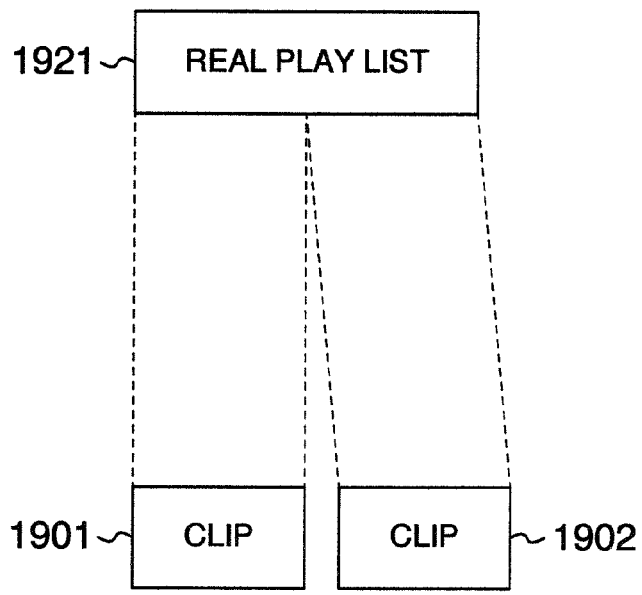
FIG. 19 is a schematic diagram showing the example of coupling of the real play lists.
FIG. 20 is a table showing 3D flags before and after the coupling of the real play lists.

FIG. 18 and FIG. 19 are diagrams showing an example of the coupling of real play lists.

Reference numeral 1811 denotes a real play list referencing a clip 1801 via a play item, which is not shown.

Reference numeral 1801 denotes the clip.

Reference numeral 1812 denotes a real play list referencing a clip 1802 via a play item, which is not shown.

Reference numeral 1802 denotes the clip.

Reference numeral 1901 denotes a clip which is the same as the clip 1801.

Reference numeral 1902 denotes a clip which is the same as the clip 1802.

Reference numeral 1921 denotes a real play list referencing the clip 1901 and the clip 1902 via play items, which are not shown.

FIG. 20 is a table showing the 3D flags before and after coupling of the real play lists.

Reference numeral 2051 denotes the table showing the set values of the 3D flags in the real play lists 1811, 1812, and 1921 before and after the coupling. If the contents of both of the clip 1801 and the clip 1802 are 3D, 1 is set. If both of them are not 3D, 0 is set. If only either one of them is 3D, coupling is prohibited.

Alternatively, another embodiment may be a method in which, instead of prohibiting the coupling, the user is warned that the list will be a play list including 3D contents and non-3D contents mixed therein; and, if the user selects coupling execution, 1 is set as the 3D flag, and a coupled real play list is generated.

Figure 39:
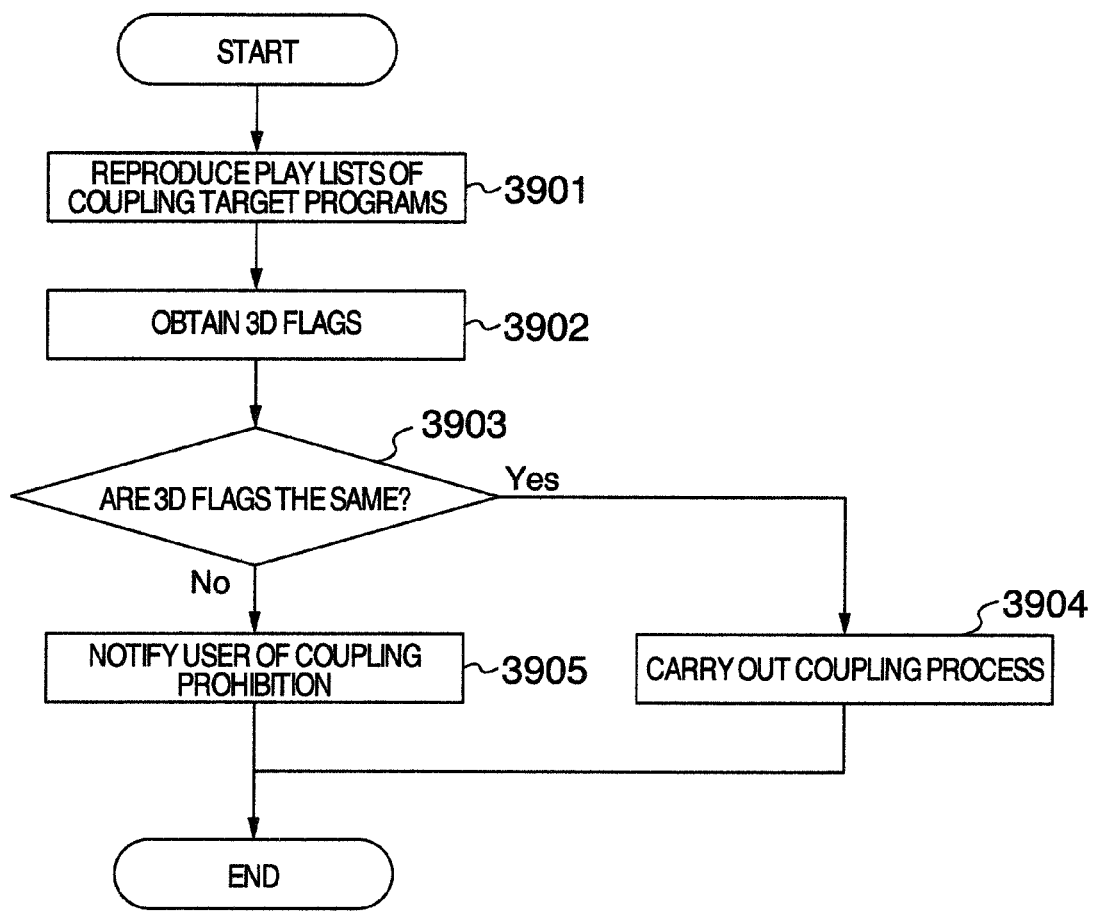
FIG. 39 is a flow chart of a coupling process of real play lists.

FIG. 39 is a diagram showing a coupling process flow of the real play lists.

When editing of coupling two real play lists is started, the play lists of the coupling target programs are reproduced from the drive 1101 (step 3901), and the 3D flags thereof are obtained (step 3902).

The CPU 1161 determines whether the 3D flags have the same value or not (step 3903). If both of them are 1 or both of them are 0, the CPU carries out a coupling process (step 3904), otherwise, the CPU notifies the user of the fact that the coupling process of these play lists is prohibited (step 3905); and, the process is terminated.

(4) Deletion of Entire Real Play List

When the entirety of a certain real play list is deleted, the referenced range of a referenced clip is deleted.

Figures 21, 22:
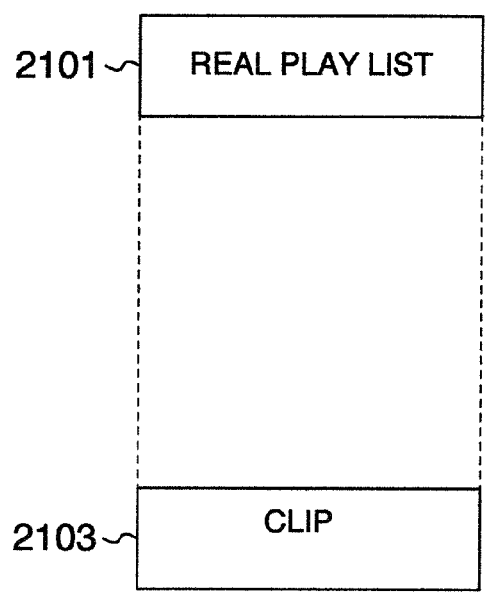
FIG. 21 is a schematic diagram showing an example of deletion of a real play list.
FIG. 22 is a table showing a 3D flag before and after the deletion of the real play list.

FIG. 21 is a diagram showing an example of deletion of a real play list.

Reference numeral 2101 denotes the real play list referencing a clip 2103 via a play item, which is not shown.

Reference numeral 2103 denotes the clip.

FIG. 22 is a table showing the 3D flag before and after the deletion of the real play list.

Reference numeral 2251 denotes the table showing the set values of the 3D flag in the real play list 1601 before and after the deletion. Regardless whether the contents of the clip 2103 are 3D or not 3D, the real play list 2101 can be deleted.

(5) Deletion of Part of Real Play List

When part of a clip referenced by a real play list is to be deleted, a play item is changed to cause a necessary part to remain, but a part not referenced in the clip is deleted.

Figure 23:
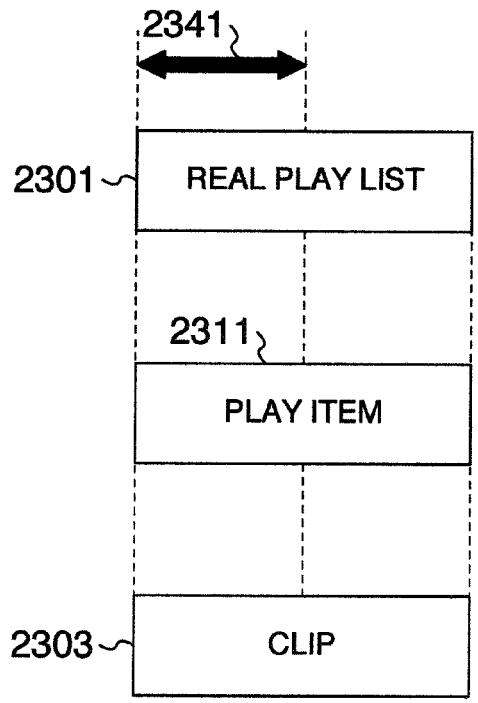
FIG. 23 is a schematic diagram showing an example of partial deletion of a top part of a real play list.
Figure 24:
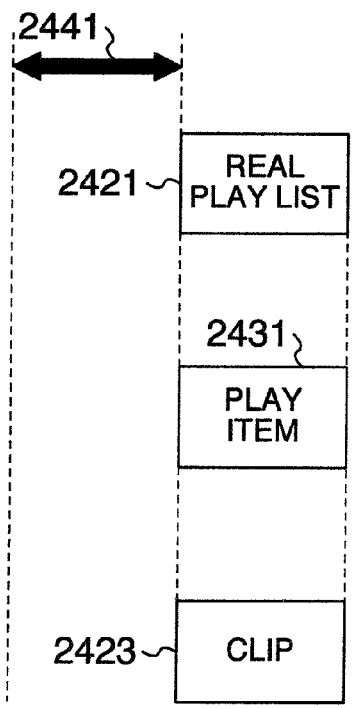
FIG. 24 is a schematic diagram showing the example of the partial deletion of the top part of the real play list.

FIG. 23 and FIG. 24 are diagrams showing an example of partial deletion of a top part of a real play list.

Reference numeral 2301 denotes a real play list referencing a play item 2311.

Reference numeral 2311 denotes the play item referencing a clip 2303.

Reference numeral 2303 denotes the clip.

Reference numeral 2421 denotes a real play list referencing a play item 2431.

Reference numeral 2441 denotes a deletion range, wherein the example in which the part corresponding to the left side of the real play list 2301 is partially deleted is shown.

Reference numeral 2431 denotes the play item referencing a clip 2423.

Reference numeral 2423 denotes the clip.

Figures 25, 26:
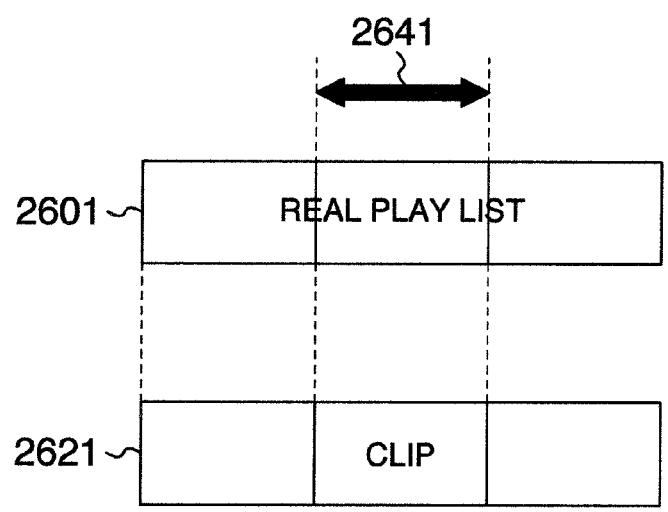
FIG. 25 is a table showing 3D flags before and after the partial deletion of the top part of the real play list.
FIG. 26 is a schematic diagram showing an example of partial deletion of an intermediate part of a real play list.

FIG. 25 is a table showing the 3D flag before and after the partial deletion of the top part of the real play list.

Reference numeral 2551 denotes the table showing the set values of the 3D flags in the real play lists 2301 and 2421 before and after the partial deletion. If the contents of the clip 2303 are 3D, 1 is set; otherwise, 0 is set.

When an intermediate part of a clip AV stream is to be edited and deleted, the remaining parts are coupled into one clip file.

Figures 27, 28:
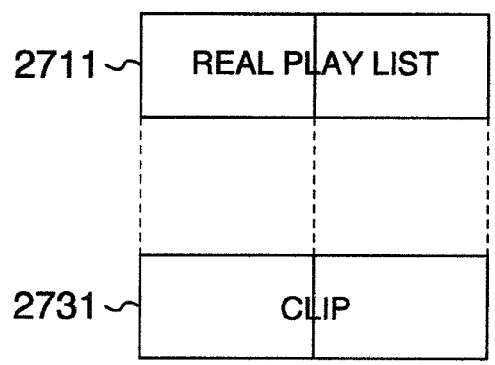
FIG. 27 is a schematic diagram showing the example of the partial deletion of the intermediate part of the real play list.
FIG. 28 is a table showing 3D flags in the example of the partial deletion of the intermediate part of the real play list.

FIG. 26 and FIG. 27 are diagrams showing an example of partial deletion of an intermediate part of a real play list.

Reference numeral 2601 denotes a real play list referencing a clip 2621 via a play item, which is not shown.

Reference numeral 2621 denotes the clip.

Reference numeral 2641 denotes a deletion range, wherein the example of partially deleting the part corresponding to an intermediate region of the real play list 2601 (=center-removing deletion) is shown.

Reference numeral 2711 denotes a real play list referencing a clip 2731 via a play item, which is not shown.

Reference numeral 2731 denotes the clip.

FIG. 28 is a table showing the 3D flags in the example of the partial deletion of the intermediate part of the real play list.

Reference numeral 2851 denotes the table showing the set values of the 3D flags in the real play lists 2601 and 2711 before and after the partial deletion. If the contents of the clip 2621 are 3D, 1 is set; otherwise, 0 is set.

If a real play list and a clip used by the real play list are changed, mismatching with a virtual play list using the same clip may occur. In such a case, below operation is carried out.

Warning and confirmation with respect to the user is carried out. If the real play list and the part of the clip are deleted by a deleting operation, the virtual play list using the same part of the clip may be deleted.

Alternatively, it is conceivable to carry out the operation of causing the virtual play list file to remain without change and deleting only the play item that has been referenced by the virtual play list and including the deleted part of the clip.

The operations related to the operations of the virtual play lists include the below operations.
(1) Assemble Editing.

As shown in FIG. 29 to FIG. 36, a play item desired to be reproduced by the user can be generated and coupled with another play item by using a virtual play list.

Reproduction of smooth connection at a coupling point can be realized by generating a bridge clip file. In order to seamlessly connect and reproduce MPEG video streams, the reproduction is generally realized by re-encoding an extremely small number of pictures in the vicinity of the coupling point and bridge-clipping them.

By virtue of this process, the original clip AV stream files and the clip information files thereof are not required to be changed.

Figure 29:
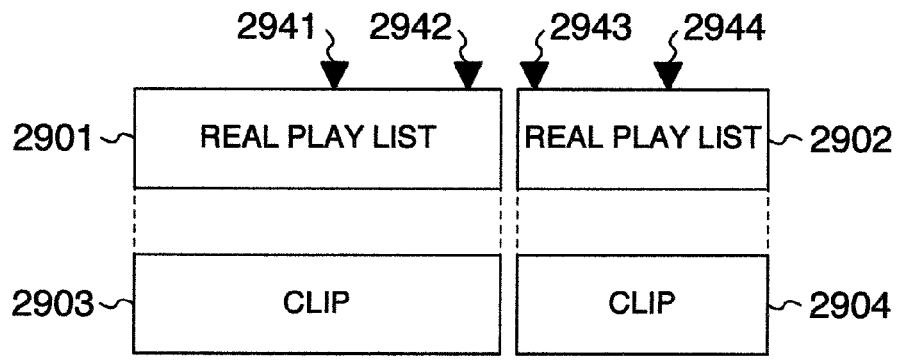
FIG. 29 is a schematic diagram showing an example of assemble editing (non-seamless connection of two play items)
Figure 30:
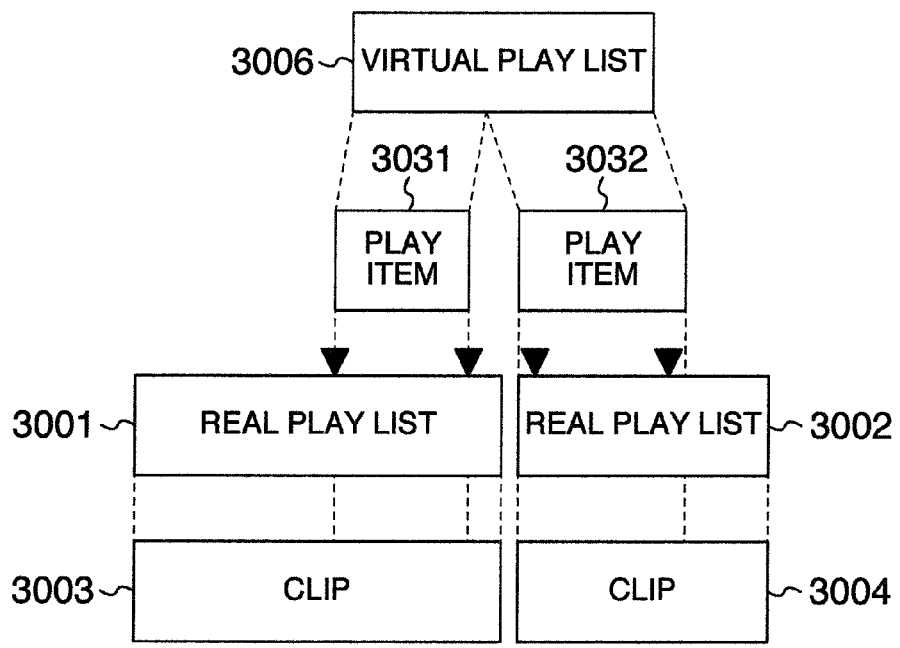
FIG. 30 is a schematic diagram showing the example of the assemble editing (non-seamless connection of the two play items)

FIG. 29 and FIG. 30 are diagrams showing an example of assemble editing (non-seamless connection of two play items).

Reference numeral 2901 denotes a real play list referencing a clip 2903 via a play item, which is not shown.

Reference numeral 2903 denotes the clip.

Reference numeral 2902 denotes a real play list referencing a clip 2904 via a play item, which is not shown.

Reference numeral 2904 denotes the clip.

Reference numeral 2941 denotes an IN point serving as the IN time of a play item 3031 to be registered in a virtual play list.

Reference numeral 2942 denotes an OUT point serving as the OUT time of the play item 3031 to be registered in the virtual play list.

Reference numeral 2943 denotes an IN point serving as the IN time of a play item 3032 to be registered in the virtual play list.

Reference numeral 2944 denotes an OUT point serving as the OUT time of the play item 3032 to be registered in the virtual play list.

Reference numeral 3006 denotes the virtual play list referencing the play item 3031 and the play item 3032.

Reference numeral 3031 denotes the play item referencing part of a real play list 3001.

Reference numeral 3032 denotes the play item referencing part of a real play list 3002.

Reference numeral 3003 denotes a clip which is the same as the clip 2903.

Reference numeral 3004 denotes a clip which is the same as the clip 2904.

FIG. 31 is a table showing the 3D flags before editing in the example of the assemble editing (non-seamless connection of the two play items).

Reference numeral 3151 denotes the table showing the set values of the 3D flags in the real play lists 2901 and 2902 before generation of the virtual play list. If the contents of the clips 2903 and 2904 are 3D, 1 is set, respectively. Otherwise, 0 is set.

FIG. 32 is a table showing the 3D flags after the editing in the example of the assemble editing (non-seamless connection of the two play items).

Reference numeral 3252 denotes the set values of the 3D flags in the virtual play list 3006 after generation of the virtual play list. If the clip 3003 is 3D and the contents of 3004 are 3D, 1 is set. If the clip 3003 is not 3D and the contents of 3004 are not 3D, 0 is set. If the contents of either one of the clips 3003 and 3004 are 3D, the user is warned upon the virtual play list generation that the virtual play list in which 3D contents and non-3D contents are mixed is to be generated; and, then, if the user selects generation, 1 is set.

Alternatively, another embodiment may be a method in which the user is notified of the fact that generation of the virtual play list in which 3D contents and non-3D contents are mixed is prohibited so as to prohibit the generation.

Figure 40:
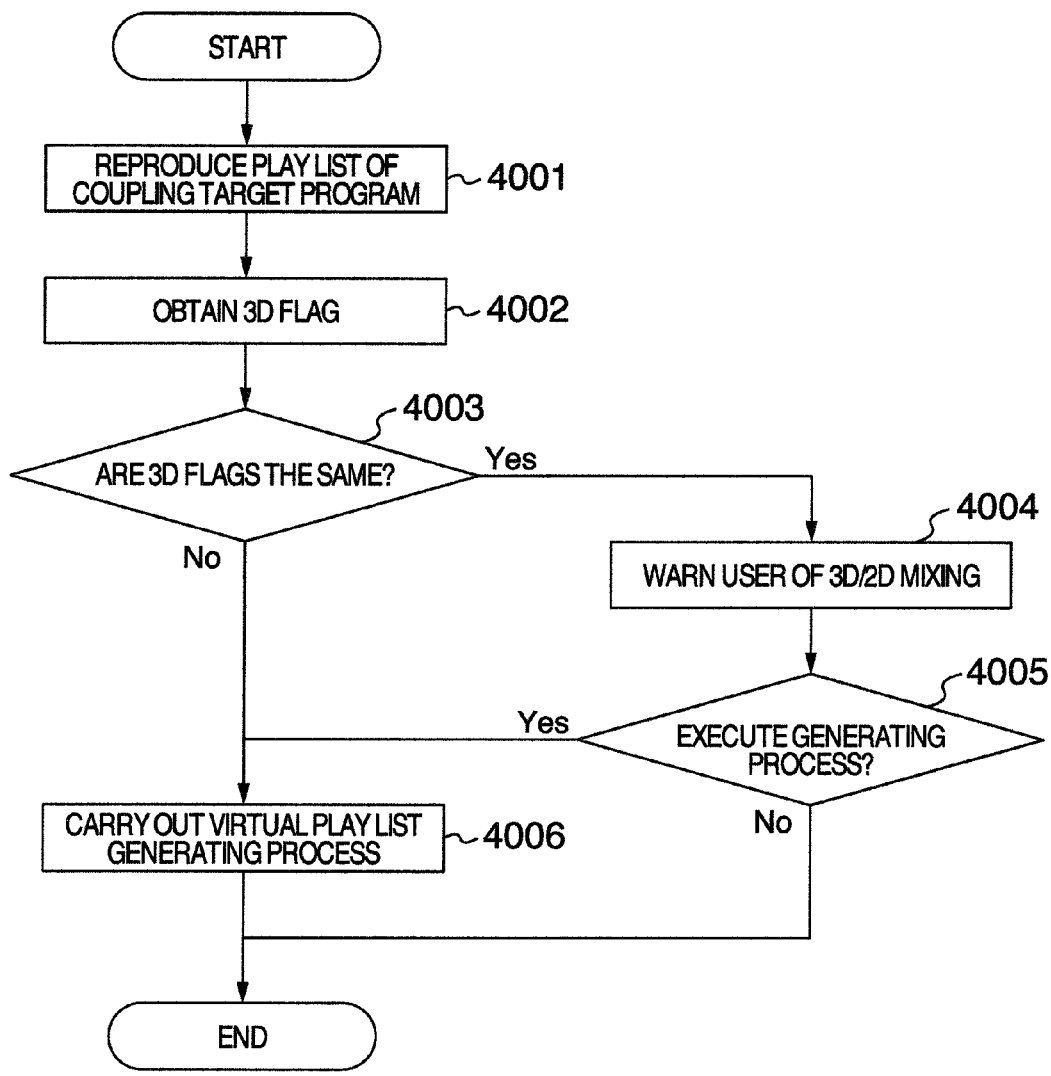
FIG. 40 is a process flow chart of assemble editing (non-seamless connection of two play items)

FIG. 40 is a diagram showing the process flow of the assembling editing (non-seamless connection of two play items).

When the editing of coupling two real play lists by a virtual play list is started, the play lists of the coupling target programs are reproduced from the drive 1101 (step 4001), and the 3D flags thereof are obtained (step 4002).

The CPU 1161 determines whether the 3D flags have the same value or not (step 4003). If both of them are 1 or both of them are 0, a virtual play list generating process is carried out (step 4006). Otherwise, the user is warned of the fact that a virtual play list in which these 2D and 3D contents are mixed is to be generated (step 4004). If the user selects the generation process execution (step 4005), a virtual play list generating process is carried out (step 4006), the list is recorded on a disk, and the process is terminated. If the user does not select the generation process execution, the process is terminated.

FIG. 33 and FIG. 34 are drawings showing an example of assemble editing (seamless connection of two play items).

Reference numeral 3301 denotes a real play list referencing a clip 3303 via a play item, which is not shown.

Reference numeral 3303 denotes a clip.

Reference numeral 3302 denotes a real play list referencing a clip 3304 via a play item, which is not shown.

Reference numeral 3304 denotes the clip.

Reference numeral 3341 denotes an IN point serving as the IN time of a play item 3431 to be registered in a virtual play list.

Reference numeral 3342 denotes an OUT point serving as the OUT time of the play time 3431 to be registered in the virtual play list.

Reference numeral 3343 denotes an IN point serving as the IN time of a play item 3432 to be registered in the virtual play list.

Reference numeral 3344 denotes an OUT point serving as the OUT time of the play item 3432 to be registered in the virtual play list.

Reference numeral 3406 denotes the virtual play list referencing the play item 3431 and the play item 3432.

Reference numeral 3431 denotes the play item referencing part of a play list 3401.

Reference numeral 3432 denotes the play item referencing part of a real play list 3402.

Reference numeral 3403 denotes a clip which is the same as the clip 3303.

Reference numeral 3404 denotes a clip which is the same as the clip 3304.

FIG. 35 is a table showing the 3D flags before the editing of the example of assemble editing (seamless connection of the two play items).

Reference numeral 3551 denotes the table showing the set values of the 3D flags in the real play lists 3301 and 3302 before generation of the virtual play list. If the contents of the clips 3303 and 3304 are 3D, 1 is set, respectively; otherwise, 0 is set.

FIG. 36 is a table showing the 3D flags after the editing of the example of the assemble editing (seamless connection of the two play items).

Reference numeral 3652 denotes the table showing the set values of the 3D flag in the virtual play list 3406 after generation of the virtual play list. If the clip 3403 is 3D and the contents of 3404 are 3D, 1 is set. If the clip 3403 is not 3D and the contents of 3404 are not 3D, 0 is set. If the contents of either one of the clips 3403 and 3404 are 3D, generation of the virtual play list is prohibited.

Alternatively, another embodiment may be a method in which the user is warned of the fact that a virtual play list in which 3D contents and non-3D contents are mixed is to be generated, and, if the user selects generation, a virtual play list in which the 3D flag is set to 1 is generated.

Figure 41:
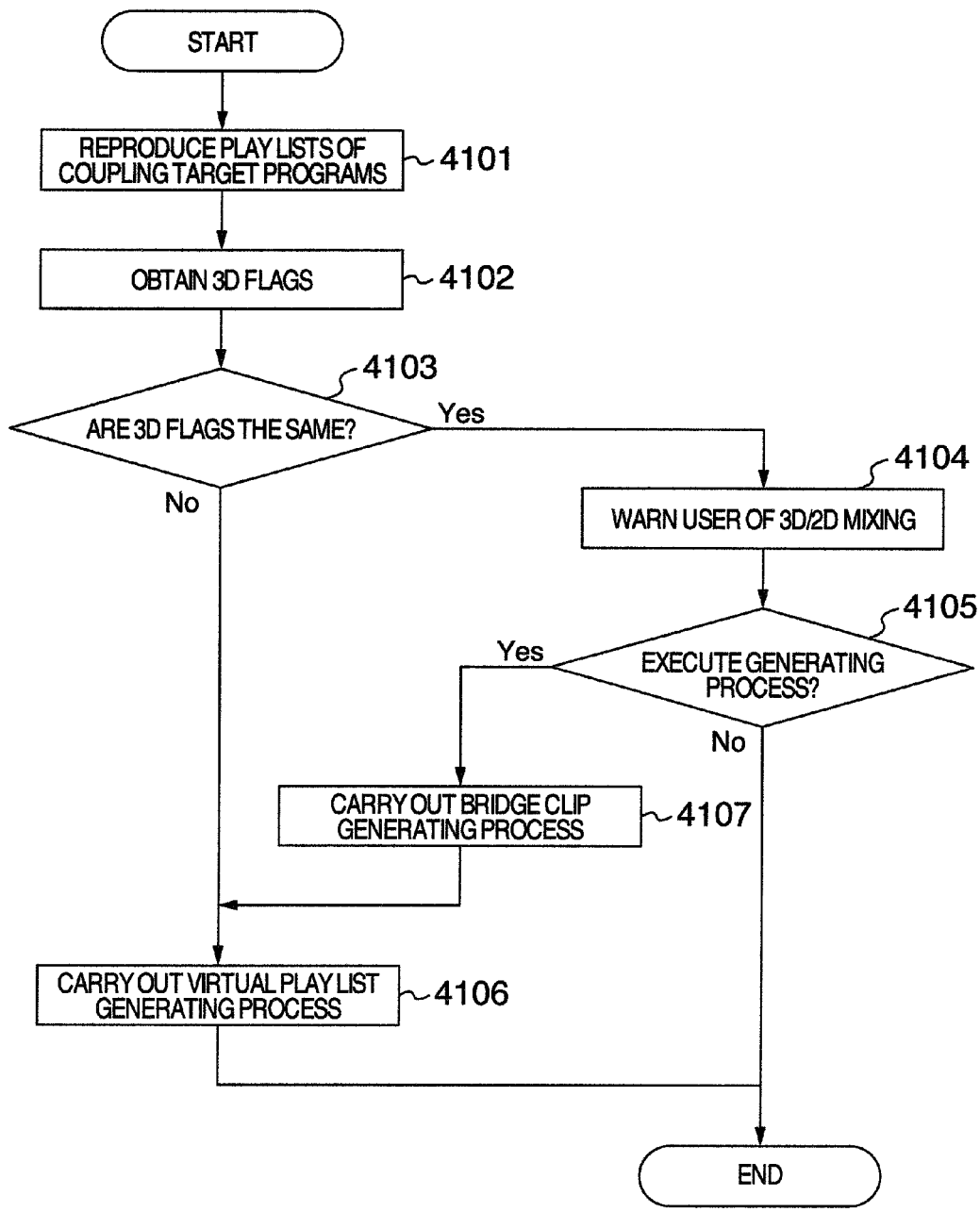
FIG. 41 is a process flow chart of assemble editing (seamless connection of two play items).

FIG. 41 is a diagram showing a process flow of the assemble editing (non-seamless connection of the two play items).

When the editing of coupling the two real play lists by the virtual play list is started, the play lists of the coupling target programs are reproduced from the drive 1101 (step 4101), and the 3D flags thereof are obtained (step 4102).

The CPU 1161 determines whether the 3D flags have the same value or not (step 4103). If both of them are 1 or 0, the virtual play list generating process is carried out (step 4106). Otherwise, the user is warned of the fact that the virtual play list in which these 2D and 3D contents are mixed is to be generated (step 4104). If the user selects generation process execution (step 4105), a bridge clip generating process is carried out (step 4107), a virtual play list generating process is carried out (step 4106), the clip and the list are recorded on a disk, and the process is terminated. If the user does not select the generation process execution, the process is terminated.

(2) Re-Editing of Virtual Play List

An editing method of changing the IN point or the OUT point of a play item of a virtual play list by adding or inserting the play item to the virtual play list or deleting the play item in the virtual play list is conceivable.

When the IN point and/or the OUT point referenced by the bridge clip is changed by a user operation, the recorder warns the user that the existing bridge clip has to be deleted and a new bridge clip has to be generated to make a confirmation with the user; and, then, such a process is executed, which is a conceivable process.

(3) Deletion of Virtual Play List

The entirety of the virtual play list is deleted.

(4) Postrecording Editing in Virtual Play List

Additional sound can be recorded (=postrecording) with respect to the virtual play list. The added sound can be added as a sub path.

The operations common to the virtual play list and the real play list include the below operation.

(1) Change Reproducing Order of Play Lists

Changing the reproducing order can be realized by changing a play list table defining the reproducing order of play lists. The clips per se are not changed by this operation.

The present invention is not limited to the above described embodiments, but includes various modification examples. For example, the above described embodiments are explained in detail for understandably explaining the present invention, and the present invention is not necessarily limited to those provided with all of the explained constitutions. Moreover, part of the constitutions of a certain embodiment can be replaced by the constitution of another embodiment. Also, the constitution of an embodiment can be added to the constitution of another embodiment. Moreover, part of the constitutions of the embodiments can be subjected to addition/deletion/replacement of other constitutions.

Part or all of the above described constitutions, functions, processing units, processing means, and the like may be realized by hardware, for example, by designing them by an integrated circuit. Also, the above described constitutions, functions, etc. may be realized by software by interpreting and executing the programs for realizing the corresponding functions by a processor. The information of the programs, tables, files, etc. for realizing the functions can be placed in a recording apparatus such as a memory, hard disk, or SSD (Solid State Drive) or a recording medium such as an IC card, a SD card, or a DVD.

The control lines and information lines which are conceived to be essential for explanations have been shown, and not all of the control lines and information lines as a product are shown for sure. In practice, almost all of the constitutions may be considered to be connected mutually.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A recording method for edited play list files on a recording medium, the recording method comprising:
    recording an AV stream;
    recording a play list file defining a reproducing order of the AV stream, the play list file including user interface application information and play list information, the user interface application information including a 3D flag indicating whether the play list file includes 3D contents or not;

when a plurality of play list files are recorded on the recording medium, coupling the play list files for editing the play list files; and warning users when a 3D flag indicating that a 3D content is included is recorded in one of the play list files to be coupled, while a 3D a indicating that a 3D content is not included is recorded in another of the play list files to be coupled.

2. A recording apparatus for edited play list files on a recording medium, the recording apparatus comprising:

a recording unit for recording an AV stream and a play list file on the recording medium, the play list file defining a reproducing order of the AV stream, and the recording unit coupling, when a plurality of play list files are recorded on the recording medium, the play list files for editing the play list files; and a control unit for controlling the recording unit; wherein the control unit controls the recording unit to record information on the recording medium so that the play list file includes user interface application information and play list information, and that the user interface application information includes a 3D flag indicating whether the play list includes 3D contents or not, and wherein upon editing coupling of the play list files, the control unit controls to warn users when a 3D flag indicating that a 3D content is included is recorded in one of the play list files to be coupled while a 3D flag indicating that a 3D content is not included is recorded in another of the play list files to be coupled.

* * * * *